(12) United States Patent
Hauf et al.

(10) Patent No.: US 9,832,428 B2
(45) Date of Patent: Nov. 28, 2017

(54) FAST MEASUREMENT OF DROPLET PARAMETERS IN INDUSTRIAL PRINTING SYSTEM

(71) Applicant: Kateeva, Inc., Newark, CA (US)

(72) Inventors: Christopher Hauf, Belmont, CA (US); Eliyahu Vronsky, Los Altos, CA (US)

(73) Assignee: Kateeva, Inc., Newark, CA (US)

( * ) Notice: Subject to any disclaimer, the term of this patent is extended or adjusted under 35 U.S.C. 154(b) by 23 days.

(21) Appl. No.: 14/840,343

(22) Filed: Aug. 31, 2015

(65) Prior Publication Data

US 2015/0373305 A1 Dec. 24, 2015

Related U.S. Application Data

(63) Continuation-in-part of application No. 14/340,403, filed on Jul. 24, 2014, now Pat. No. 9,352,561, which
(Continued)

(51) Int. Cl.
B05D 5/12 (2006.01)
H04N 7/18 (2006.01)
(Continued)

(52) U.S. Cl.
CPC .............. *H04N 7/18* (2013.01); *B41J 2/0456* (2013.01); *B41J 2/04561* (2013.01);
(Continued)

(58) Field of Classification Search
USPC ................................................ 427/8; 347/17
See application file for complete search history.

(56) References Cited

U.S. PATENT DOCUMENTS 4,922,270 A 5/1990 Cobbs
4,963,882 A 10/1990 Hickman
(Continued)

FOREIGN PATENT DOCUMENTS

EP 0 863 004 9/1998
EP 0 863 478 9/1998
(Continued)

OTHER PUBLICATIONS

Gao et al., "The Physics of Digital Microfabrication with Molten Microdrops," 1993, Solid Freeform Fabrication—Conference, $4^{th}$ Symposium, Solid freeform fabrication, University of Texas, pp. 237-244.
(Continued)

*Primary Examiner* — Austin Murata
(74) *Attorney, Agent, or Firm* — Marc P. Schuyler

(57) ABSTRACT

A droplet measurement system (DMS) is used in concern with an industrial printer used to fabricate a thin film layer of a flat panel electronic device. A clear tape serves as a printing substrate to receive droplets from hundreds of nozzles simultaneously, while an optics system photographs the deposited droplets through the tape (i.e., through a side opposite the printhead). This permits immediate image analysis of deposited droplets, for parameters such as per-nozzle volume, landing position and other characteristics, without having to substantially reposition the DMS or printhead. The tape can then be advanced and used for a new measurement. By providing such a high degree of concurrency, the described system permits rapid measurement and update of droplet parameters for printers that use hundreds or thousands of nozzles, to provide a real-time understanding of per-nozzle expected droplet parameters, in a manner that can be factored into print planning.

26 Claims, 10 Drawing Sheets

Related U.S. Application Data is a continuation-in-part of application No. PCT/US2014/035193, filed on Apr. 23, 2014, and a continuation-in-part of application No. 14/162,525, filed on Jan. 23, 2014, now Pat. No. 9,010,899, which is a continuation of application No. PCT/US2013/077720, filed on Dec. 24, 2013, said application No. 14/340,403 is a continuation-in-part of application No. PCT/US2014/035193, filed on Apr. 23, 2014.

(60) Provisional application No. 62/044,958, filed on Sep. 2, 2014, provisional application No. 61/746,545, filed on Dec. 27, 2012, provisional application No. 61/822,855, filed on May 13, 2013, provisional application No. 61/842,351, filed on Jul. 2, 2013, provisional application No. 61/857,298, filed on Jul. 23, 2013, provisional application No. 61/898,769, filed on Nov. 1, 2013, provisional application No. 61/920,715, filed on Dec. 24, 2013, provisional application No. 61/816,696, filed on Apr. 26, 2013, provisional application No. 61/866,031, filed on Aug. 14, 2013.

(51) Int. Cl.
*G06T 7/00* (2017.01)
*B41J 2/045* (2006.01)
*B41J 2/21* (2006.01)
*B41J 2/195* (2006.01)

(52) U.S. Cl.
CPC .......... *B41J 2/04581* (2013.01); *B41J 2/195* (2013.01); *B41J 2/2132* (2013.01); *B41J 2/2142* (2013.01); *G06T 7/0004* (2013.01)

(56) References Cited

U.S. PATENT DOCUMENTS

| | | |
|---|---|---|
| 5,434,430 A | 7/1995 | Stewart |
| 5,469,276 A | 11/1995 | Shu |
| 5,555,006 A | 9/1996 | Cleveland et al. |
| 5,561,449 A | 10/1996 | Raskin et al. |
| 5,681,757 A | 10/1997 | Hayes |
| 5,707,684 A | 1/1998 | Hayes et al. |
| 5,711,989 A | 1/1998 | Ciardella et al. |
| 5,847,720 A | 12/1998 | Dunand |
| 5,895,692 A | 4/1999 | Shiraski et al. |
| 5,906,682 A | 5/1999 | Bouras et al. |
| 5,932,012 A | 8/1999 | Ishida et al. |
| 6,019,454 A | 2/2000 | Serra et al. |
| 6,149,263 A | 11/2000 | Nakano |
| 6,164,746 A | 12/2000 | Akahira et al. |
| 6,228,228 B1 | 5/2001 | Singh et al. |
| 6,247,787 B1 | 6/2001 | Giere et al. |
| 6,283,572 B1 | 9/2001 | Kumar et al. |
| 6,328,395 B1 | 12/2001 | Kitahara et al. |
| 6,347,857 B1 | 2/2002 | Purcell et al. |
| 6,352,331 B1 | 3/2002 | Armijo et al. |
| 6,354,686 B1 | 3/2002 | Tanaka et al. |
| 6,401,001 B1 | 6/2002 | Jang et al. |
| 6,406,114 B1 | 6/2002 | Shioya |
| 6,481,816 B1 | 11/2002 | Oyen |
| 6,517,176 B1 | 2/2003 | Chaug |
| 6,565,177 B1 | 5/2003 | Corrigan, III |
| 6,629,741 B1 | 10/2003 | Okuda et al. |
| 6,736,484 B2 | 5/2004 | Nakamura |
| 6,739,686 B2 | 5/2004 | Imai |
| 6,754,551 B1 | 6/2004 | Zohar et al. |
| 6,783,210 B2 | 8/2004 | Takahashi et al. |
| 6,793,324 B2 | 9/2004 | Hosono et al. |
| 6,824,238 B2 | 11/2004 | Chang |
| 6,837,568 B2 | 1/2005 | Nakamura |
| 6,910,762 B2 | 1/2005 | Nakamura |
| 6,863,961 B2 | 3/2005 | Miyashita et al. |
| 7,072,522 B2 | 7/2006 | Miyake et al. |
| 7,073,727 B2 | 7/2006 | Usuda |
| 7,093,924 B2 | 8/2006 | Nakamura |
| 7,111,755 B2 | 9/2006 | Koyama et al. |
| 7,121,642 B2 | 10/2006 | Stoessel et al. |
| 7,188,919 B2 | 3/2007 | Satomura |
| 7,204,573 B2 | 4/2007 | Koyama |
| 7,207,647 B2 | 4/2007 | Silverbrook |
| 7,216,950 B2 | 5/2007 | Eguchi et al. |
| 7,217,438 B2 | 5/2007 | Newsome et al. |
| 7,258,408 B2 | 8/2007 | Usuda |
| 7,270,712 B2 | 9/2007 | Edwards et al. |
| 7,278,847 B2 | 10/2007 | Silverbrook |
| 7,281,778 B2 | 10/2007 | Hasenbein et al. |
| 7,449,070 B2 | 11/2008 | Edwards et al. |
| 7,461,912 B2 | 12/2008 | Kamiyama et al. |
| 7,503,637 B2 | 3/2009 | Komatsu et al. |
| 7,513,595 B2 | 4/2009 | Nakamura |
| 7,554,697 B2 | 6/2009 | Mizutani et al. |
| 7,600,840 B2 | 10/2009 | Kim et al. |
| 7,611,754 B2 | 11/2009 | Edwards et al. |
| 7,612,917 B2 | 11/2009 | Nagaishi et al. |
| 7,616,340 B2 | 11/2009 | Yamazaki |
| 7,658,465 B2 | 2/2010 | Newsome et al. |
| 7,677,689 B2 | 3/2010 | Kim et al. |
| 7,699,428 B2 | 4/2010 | Kato |
| 7,757,632 B2 | 7/2010 | Edwards et al. |
| 7,815,965 B2 | 10/2010 | Edwards et al. |
| 7,839,080 B2 | 11/2010 | Kim et al. |
| 7,850,267 B2 | 12/2010 | Usuda |
| 7,887,156 B2 | 2/2011 | Middleton et al. |
| 7,891,752 B2 | 2/2011 | Liu et al. |
| 7,909,427 B2 | 3/2011 | Kim et al. |
| 7,914,104 B2 | 3/2011 | Silverbrook |
| 8,025,353 B2 | 9/2011 | Hesenbein |
| 8,033,634 B2 | 10/2011 | Komatsu et al. |
| 8,066,345 B2 | 11/2011 | Komori et al. |
| 8,119,186 B2 | 2/2012 | Sakai |
| 8,123,324 B2 | 2/2012 | Komori et al. |
| 8,186,791 B2 | 5/2012 | Yamashita |
| 8,235,487 B2 | 8/2012 | Madigan et al. |
| 8,248,656 B2 | 8/2012 | Lin et al. |
| 8,310,721 B2 | 11/2012 | Saita et al. |
| 8,323,724 B2 | 12/2012 | Shinohara et al. |
| 8,342,623 B2 | 1/2013 | Hong et al. |
| 8,382,232 B2 | 2/2013 | Silverbrook |
| 8,383,202 B2 | 2/2013 | Somekh et al. |
| 8,413,602 B2 | 4/2013 | Nakamura |
| 8,449,058 B2 | 5/2013 | Hasenbein et al. |
| 8,459,768 B2 | 6/2013 | Hasenbein et al. |
| 8,466,484 B2 | 6/2013 | Van Slyke et al. |
| 8,579,408 B2 | 11/2013 | Kelly et al. |
| 2002/0109862 A1 | 8/2002 | Hayama |
| 2002/0180816 A1 | 12/2002 | Haflinger |
| 2003/0087026 A1 | 5/2003 | Dijksman et al. |
| 2003/0101421 A1 | 5/2003 | Satoh |
| 2003/0197747 A1 | 10/2003 | Hattori |
| 2004/0027405 A1 | 2/2004 | Stoessel et al. |
| 2004/0104951 A1 | 6/2004 | Shibata et al. |
| 2004/0170762 A1 | 9/2004 | Newsome et al. |
| 2004/0223014 A1 | 11/2004 | Barr et al. |
| 2005/0200684 A1 | 9/2005 | Sakurada et al. |
| 2005/0247340 A1 | 10/2005 | Zeira |
| 2006/0046347 A1 | 3/2006 | Wood et al. |
| 2006/0093751 A1 | 5/2006 | White et al. |
| 2006/0126121 A1 | 6/2006 | Chung |
| 2006/0132529 A1 | 6/2006 | Verhoest et al. |
| 2006/0214976 A1 | 9/2006 | Iwao et al. |
| 2007/0070099 A1 | 3/2007 | Beer et al. |
| 2007/0109606 A1 | 5/2007 | Nagae |
| 2007/0176173 A1 | 8/2007 | Ramakrishnan et al. |
| 2008/0024532 A1 | 1/2008 | Kim |
| 2008/0049231 A1 | 2/2008 | Bachalo et al. |
| 2008/0117247 A1 | 5/2008 | Miller et al. |
| 2008/0150419 A1 | 6/2008 | Kang |
| 2008/0158278 A1 | 7/2008 | Inoue |
| 2008/0227663 A1 | 9/2008 | Tisone et al. |
| 2008/0278534 A1 | 11/2008 | Kim et al. |

(56) References Cited

U.S. PATENT DOCUMENTS

| | | | |
|---|---|---|---|
| 2008/0305969 A1 | 12/2008 | Djiksman et al. | |
| 2008/0308037 A1 | 12/2008 | Bulovic et al. | |
| 2008/0309698 A1* | 12/2008 | Nakano | G02F 1/133711 347/14 |
| 2009/0096823 A1 | 4/2009 | Watt et al. | |
| 2009/0096825 A1 | 4/2009 | Takahashi et al. | |
| 2009/0109342 A1 | 4/2009 | Heng et al. | |
| 2009/0322828 A1 | 12/2009 | Kim et al. | |
| 2010/0090582 A1 | 4/2010 | Okishiro et al. | |
| 2010/0166950 A1 | 7/2010 | Nieminem | |
| 2011/0032297 A1 | 2/2011 | Mitsuzawa | |
| 2011/0084290 A1 | 4/2011 | Nakamura et al. | |
| 2011/0087718 A1 | 4/2011 | Srinivasan et al. | |
| 2011/0121021 A1 | 5/2011 | Dudenhoefer et al. | |
| 2011/0222126 A1 | 9/2011 | Asai et al. | |
| 2011/0267390 A1 | 11/2011 | Bulovic et al. | |
| 2011/0279544 A1 | 11/2011 | Dovrat et al. | |
| 2012/0056923 A1 | 3/2012 | Vronsky et al. | |
| 2012/0058251 A1 | 3/2012 | Yamazaki | |
| 2012/0069076 A1 | 3/2012 | Higuchi | |
| 2012/0139984 A1 | 6/2012 | Lang | |
| 2012/0256981 A1 | 10/2012 | Matsuo | |
| 2012/0306951 A1 | 12/2012 | Somekh et al. | |
| 2013/0057879 A1 | 3/2013 | Takagi et al. | |
| 2013/0120485 A1 | 5/2013 | Kodoma et al. | |
| 2013/0127030 A1 | 5/2013 | Gong et al. | |
| 2013/0168664 A1 | 7/2013 | Crankshaw | |
| 2013/0286073 A1 | 10/2013 | Blessing et al. | |
| 2013/0307898 A1 | 11/2013 | Somekh et al. | |
| 2014/0117316 A1 | 5/2014 | Choi | |
| 2014/0184683 A1 | 7/2014 | Harjee et al. | |
| 2014/0210886 A1* | 7/2014 | Driggers | B41J 11/0095 347/13 |
| 2015/0273869 A1* | 10/2015 | Ide | H01L 31/02327 347/16 |

FOREIGN PATENT DOCUMENTS

| | | |
|---|---|---|
| EP | 0 880 303 | 11/1998 |
| EP | 0 976 567 | 2/2000 |
| EP | 1 211 916 | 6/2002 |
| EP | 0 902 315 | 4/2003 |
| EP | 1 376 716 | 1/2004 |
| EP | 1 874 551 | 1/2008 |
| JP | H05-78655 | 3/1993 |
| JP | H06-308312 | 11/1994 |
| JP | H07-169567 | 7/1995 |
| JP | H07-235378 | 9/1995 |
| JP | H07-294916 | 11/1995 |
| JP | H10-138475 | 5/1998 |
| JP | H10-012377 | 6/1998 |
| JP | 2991270 | 12/1999 |
| JP | 3036436 | 4/2000 |
| JP | 2001-038892 | 2/2001 |
| JP | 2001-121722 | 5/2001 |
| JP | 2001-162840 | 9/2001 |
| JP | 2002-225259 | 8/2002 |
| JP | 2002-323615 | 11/2002 |
| JP | 2003-249355 | 9/2003 |
| JP | 3679987 | 5/2005 |
| JP | 2005-193104 | 7/2005 |
| WO | WO 2008/059276 | 5/2008 |
| WO | WO 2008/13183 | 10/2008 |

OTHER PUBLICATIONS

Ulichney, Robert, "A Review of Halftoning Techniques," 2000, Society of Photographic Instrumentation Engineers (SPIE), vol. 3963, pp. 379-391.

Schiaffino, Stefano, "The Fundamentals of Molten Microdrop Deposition and Solidification," Aug. 7, 1996, Massachusetts Institute of Technology, 215 pages.

Jabbour, Ghassan E., "Printing Techniques in Organic Based Optoelectronics," Semiconductor Device Research Symposium, 2001 International, Dec. 5-7, 2001.

International Search Report and Written Opinion dated Apr. 30, 2014 for PCT Application No. PCT/US2013/077720.

Invitation to Pay Additional Fees and, Where Applicable, Protest Fee issued to PCT Application No. PCT/US2014/035193, dated Aug. 20, 2014, 2 pages.

Notification Of Decision On Protest, PCT/US2014/035193, dated Oct. 9, 2014, and Protest To Invitation To Pay Additional Fees, dated Sep. 18, 2014, 8 pages together.

International Search Report and Written Opinion dated Nov. 14, 2014 for PCT Application No. PCT/US2014/035193.

Response filed on Dec. 18, 2014 for the International Search and Written Opinion for PCT Application No. PCT/US2014/035193.

International Search Report and Written Opinion dated Nov. 14, 2014 for PCT Application No. PCT/US2014/050749.

Response filed on Dec. 21, 2014 for the International Search and Written Opinion for PCT Application No. PCT/US2014/050749.

Non-Final Office Action dated Apr. 3, 2014 to U.S. Appl. No. 14/162,525.

Response filed on Jun. 5, 2015 for the Non-Final Office Action for U.S. Appl. No. 14/162,525.

Notice of Allowance dated Mar. 17, 2015 to U.S. Appl. No. 14/462,525.

Non-Final Office Action dated Dec. 17, 2014 to U.S. Appl. No. 14/340,403.

Response filed on Jan. 16, 2015 for the Non-Final Office Action for U.S. Appl. No. 14/340,403.

Final Office Action dated Feb. 27, 2015 to U.S. Appl. No. 14/340,403.

Response filed on Jun. 29, 2015 for the Final Office Action for U.S. Appl. No. 14/340,403.

Notice of Allowance issued to U.S. Appl. No. 14/458,005, dated Jan. 16, 2015.

International Search Report and Written Opinion dated Dec. 11, 2015 for PCT Application PCT/US15/47687.

* cited by examiner

FAST MEASUREMENT OF DROPLET PARAMETERS IN INDUSTRIAL PRINTING SYSTEM

CROSS-REFERENCE TO RELATED APPLICATIONS

This application claims priority to U.S. Provisional Patent Application No. 62/044,958, for "Fast Measurement Of Droplet Parameters In Industrial Printing System," filed on behalf of first named inventor Christopher R. Hauf on Sep. 2, 2014. This application is also claims priority to, and is a continuation in-part of U.S. patent application Ser. No. 14/340,403 for "Techniques for Print Ink Droplet Measurement and Control to Deposit Fluids within Precise Tolerances," filed on behalf of first named inventor Nahid Harjee on Jul. 24, 2014. U.S. patent application Ser. No. 14/340,403 in turn claims priority to U.S. Provisional Patent Application No. 61/950,820 for "Techniques For Print Ink Droplet Volume Measurement And Control Over Deposited Fluids Within Precise Tolerances," filed on behalf of first named inventor Nahid Harjee on Mar. 10, 2014. U.S. patent application Ser. No. 14/340,403 in turn claims priority to, and is itself a continuation in-part of each of PCT Patent Application No. PCT/US2014/035193 for "Techniques for Print Ink Droplet Measurement and Control to Deposit Fluids within Precise Tolerances," filed on behalf of first named inventor Nahid Harjee on Apr. 23, 2014 and U.S. Utility patent application Ser. No. 14/162,525 for "Techniques for Print Ink Volume Control To Deposit Fluids Within Precise Tolerances," filed on behalf of first named inventor Nahid Harjee on Jan. 23, 2014. U.S. Utility patent application Ser. No. 14/162,525 in turn claims priority to Taiwan Patent Application No. 102148330, filed for "Techniques for Print Ink Volume Control To Deposit Fluids Within Precise Tolerances" on behalf of first named inventor Nahid Harjee on Dec. 26, 2013, and P.C.T. Patent Application No. PCT/US2013/077720, filed for "Techniques for Print Ink Volume Control To Deposit Fluids Within Precise Tolerances" on behalf of first named inventor Nahid Harjee on Dec. 24, 2013. P.C.T. Patent Application No. PCT/US2013/077720 claims priority to each of: U.S. Provisional Patent Application No. 61/746,545, for "Smart Mixing," filed on behalf of first named inventor Conor Francis Madigan on Dec. 27, 2012; U.S. Provisional Patent Application No. 61/822,855 for "Systems and Methods Providing Uniform Printing of OLED Panels," filed on behalf of first named inventor Nahid Harjee on May 13, 2013; U.S. Provisional Patent Application No. 61/842,351 for "Systems and Methods Providing Uniform Printing of OLED Panels," filed on behalf of first named inventor Nahid Harjee on Jul. 2, 2013; U.S. Provisional Patent Application No. 61/857,298 for "Systems and Methods Providing Uniform Printing of OLED Panels," filed on behalf of first named inventor Nahid Harjee on Jul. 23, 2013; U.S. Provisional Patent Application No. 61/898,769 for "Systems and Methods Providing Uniform Printing of OLED Panels," filed on behalf of first named inventor Nahid Harjee on Nov. 1, 2013; and U.S. Provisional Patent Application No. 61/920,715 for "Techniques for Print Ink Volume Control To Deposit Fluids Within Precise Tolerances," filed on behalf of first named inventor Nahid Harjee on Dec. 24, 2013. PCT Patent Application No. PCT/US2014/035193 further claims the benefit of U.S. Provisional Patent Application No. 61/816,696 for "OLED Printing Systems and Methods Using Laser Light Scattering for Measuring Ink Drop Size, Velocity and Trajectory" filed on behalf of first named inventor Alexander Sou-Kang Ko on Apr. 26, 2013, and of U.S. Provisional Patent Application No. 61/866,031 for "OLED Printing Systems and Methods Using Laser Light Scattering for Measuring Ink Drop Size, Velocity and Trajectory" filed on behalf of first named inventor Alexander Sou-Kang Ko on Aug. 14, 2013. Priority is claimed to each of the aforementioned applications and each of the aforementioned patent applications is hereby incorporated by reference.

BACKGROUND

Industrial fabrication processes are increasingly turning to printing systems to fabricate layers of products. These printing systems deposit a fluid, which is then cured or hardened to form a permanent layer of a particular product. These fabrication processes are especially useful for the fabrication of microelectronic products or products with arrays of quasi-electronic structures. For example, such printing processes are increasingly being used to manufacture thin film electronic displays and solar panels for a wide variety of applications. The mentioned printing systems are typically characterized by, in addition to the type of fluid utilized ("ink"), the use of many thousands of print nozzles on one or more printheads that are designed with capabilities to place individual, substantially uniform size droplets with near micron resolution. This precision control over both deposited droplet volume and position helps facilitate high quality in end-products as well as high-resolution, small footprint products and reduced manufacturing costs. For example, in one application, namely the manufacture of organic light emitting diode (OLED) displays, the ability to precision deposit the inks helps produce smaller, thinner, more resolute displays at lower cost. Note that while the term "ink" is used to refer to the deposited fluid, the deposited fluid is typically colorless, and is deposited as a structure that will "build" a thickness of a permanent layer of a device, i.e., the color of the fluid itself is typically not important in the sense it would be for ink used in a conventional graphics printing application.

Not surprisingly, in these applications, quality control is dependent on uniformity in deposited ink droplets, as to size (droplet volume) and precise position, or at least an understanding as to variation in such features is important to be able to produce permanent layers that consistently meet desired quality standards for layer registration accuracy and/or layer homogeneity. Note that in an industrial printing system, droplet uniformity for any given nozzle can also potentially change over time, whether due to statistical variation, changes in nozzle age, clogging, ink viscosity or constituency variation, temperature, or other factors.

What is needed is a droplet measurement system adapted for use in connection with an industrial printing process, ideally, for in situ use with a printing system used by an industrial fabrication apparatus. Ideally, such a droplet measurement system would provide near fast measurement of one or more droplet parameters, be easy to maintain, and provide inputs that could be used to adjust printing, so as to enable precise quality control for used in the industrial product fabrication processes. The present invention addresses these needs and provides further, related advantages.

Figure 1:
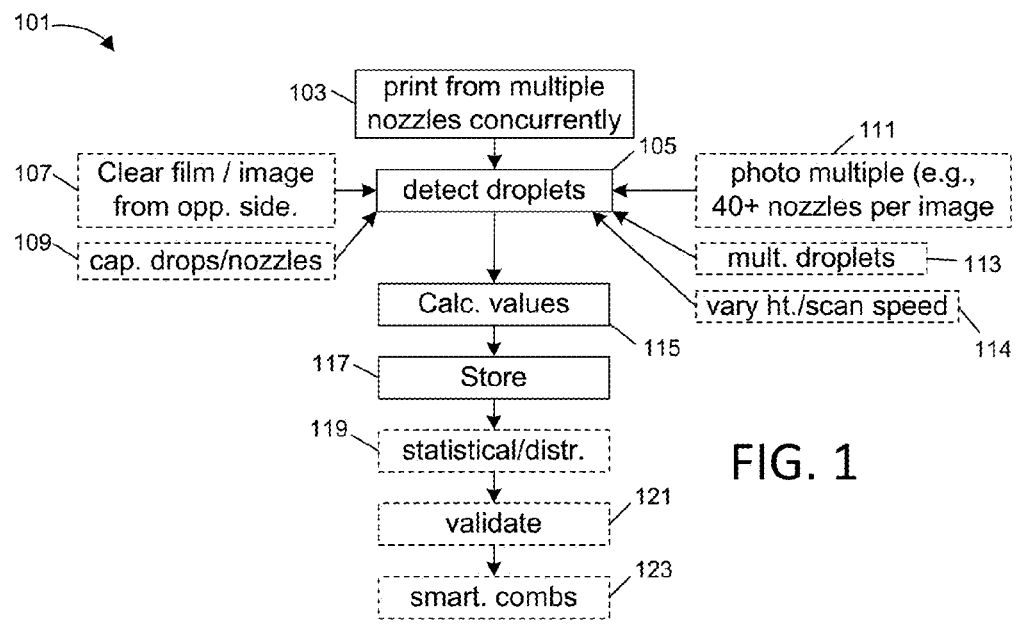
FIG. 1 is a flow chart illustrating techniques for measuring a droplet parameter.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of a droplet measurement system that optically measures or images deposited droplets on a medium, and that uses image processing to identify values of a parameter for various nozzles of a printhead used in industrial fabrication. The various techniques can be embodied as a droplet measurement system, as a printer or fabrication apparatus, or as software for performing described techniques, in the form of a computer, printer or other device running such software, or in the form of an electronic or other device (e.g., a flat panel device or other consumer end product) fabricated as a result of these techniques. While specific examples are presented, the principles described herein may also be applied to other methods, devices and systems as well.

DETAILED DESCRIPTION

In one embodiment, a droplet measurement system receives ink droplets from various nozzles of one or more printheads, and then uses optical analysis to measure a value of a parameter associated with the various droplets and/or the various printhead nozzles that produced those droplets. More specifically, as will be discussed below, some embodiments use deposition tape in a printer maintenance bay for test printing of the ink concurrently from various nozzles. The tape can advantageously be any medium capable of receiving ink droplets, although in notable embodiment discussed below, it comprises a clear film that is specially treated to fix wet ink droplets, much like photographic paper. Also in one embodiment, this system is applied in an industrial fabrication apparatus where droplets to be deposited are themselves clear or translucent (for example, representing a material that will be deposited and cured to form an encapsulation layer of a panel device, such as a display or solar panel, or light generating elements of such a device). This transparency permits image capture of groupings of one or more droplets for a set of multiple nozzles; in optional embodiments, the droplet depositions can be distinguished from both the film and imaged nozzle locations (behind the film) to provide extremely fast measurement of droplet positional offset (relative to ideal droplet position) and/or volume and/or timing errors associated with droplet deposition.

In one embodiment, to perform measurement, the printhead or printheads are parked in a maintenance station, for example, while a substrate is loaded or unloaded into the printer (and thus, while the printer/fabrication apparatus is otherwise employed). While the printheads are parked, the droplet measurement system is engaged to bring the deposition medium (e.g., the clear film) into close proximity with one or more printheads in a manner registered at a specific position relative to the one or more printheads. Nozzles from one or more of the printheads (e.g., a window or subarray comprising a subset of all nozzles) are then cause to fire one droplet or a series of droplets (e.g., 2, 5, 10, etc.), such that the droplets land on the medium close to a position expected for the given nozzle. During this time, or after this time, the film is imaged from a side of the film opposite the printhead, effectively through the transparent film; this is to say, the film is precisely positioned at a normal deposition distance relative to the nozzles being measured (e.g., <1.0 millimeters) and measurement is simultaneously (or shortly later) performed on multiple nozzles simultaneously by firing those nozzles, and then by capturing an image through the opposite side of the film, with the resultant captured image then being image processed to derived droplet parameter values.

Note several advantages to features of the various embodiments described so far. First, the mentioned optical processing of deposited droplets through the clear film is especially useful for very large printheads having hundreds to many thousands of nozzles, i.e., optical processing can be immediately performed without the requirement of further moving the printhead, the droplet measurement system or other components. Second, the droplet measurement system can be configured to measure droplets from many nozzles at the same time; for example, it is possible to jet, and concurrently measure, droplets from hundreds of nozzles. When compared to systems that optically image individual droplets in flight for example, e.g., one at a time, this type of concurrency can do much to facilitate measurement of droplets across many thousands of printhead nozzles (e.g., as is used in some industrial fabrication applications). For systems that rely on dynamically updated measurement of droplet parameters, so as to combine droplets in a manner that mitigates variation or that accounts for variation in producing precise target volumes, this type of concurrency can be important, because it does not require significant interruption in print time or in manufacturing throughput. For a droplet measurement system that articulates relative to parked printhead or printheads in a service station, this provides for easy, precision access to any of thousands of print nozzles as can be used in some industrial manufacturing processes. Also, the deposition tape or its treatment can be specially adapted to the chemical properties of a specific ink under test (i.e., to enable its properties to be more readily or more precisely ascertained by optical means). As should be apparent, the described techniques provide for enhanced accuracy and lower cost in manufacturing products, e.g., especially price-sensitive consumer products such as flat panel high definition televisions ("HDTVs").

For at least one design discussed below, the droplet measurement system mounts a clear film using a roll-to-roll mechanism, which permits advance of the film as a tape across an imaging area, permitting for intermittent change of tape rolls used for measurement. In addition, the droplet measurement system can also advantageously use a vacuum system which closely adheres that portion of the tape being deposited on in a flat, precise positional relationship that mimics an online deposition surface. The droplet measurement system can also optionally include a cure station to cure/dry ink, such that excess ink is inhibited from spread to any other portion of the system following measurement; note that this is not necessary in some embodiments, e.g., the film can also be selected to have properties or be treated to have properties such that the ink droplets once deposited are immediately fixed. Also, as noted, the droplet measurement system can optionally be mounted on a three-dimensional movable mount, i.e., so as to engage a parked printhead from below along a vertical ("z") axis and to move as desired along x (and optionally y) axes so as to reach different nozzles and different printheads. This permits a "large" printhead assembly (e.g., having thousands of nozzles) to be left stationary while the droplet measurement system is articulated beneath a printing plane (e.g., in a maintenance bay) and used to measure parameters for different groups of nozzles. One contemplated deposition process advances a roll of tape such that a window of virgin tape is adjacent selected printheads, these printheads then are controlled to have all of their nozzles eject a predetermined amount of ink, which is then fixed on the tape; simultaneously, a coaxial camera and image sensor from below (e.g., within a housing or chassis of the droplet measurement system) images all deposited droplets in parallel (once again, by image capture through an opposite site of the tape, such that the film and droplet measurement system typically does not have to be moved or repositioned for analysis). If desired, the camera (or image capture optics) can be made movable relative to the droplet measurement system, e.g., to provide for scanning activity across a range of nozzles, focus adjustment, or other desired benefit.

The output of an image processing system then provides droplet parameter data that is useful in validating nozzles or otherwise planning printing. Following any given measurement iteration, the tape and the droplet measurement system are each advanced in position, with used tape being cured and/or rolled up, and the process is then repeated as necessary, immediately or at a later time. In a design where the tape cannot be reused once printed upon, a spent roll of tape (or a tape cartridge, with reels for new and used tape and capstans) can be periodically collected or replaced on a modular basis. Note that in one contemplated application, in which a fabrication mechanism is continuously used (e.g., to print layers of OLED television screens, or otherwise to fabricate a layer of one or more flat panel devices), as a prior substrate is or unloaded, the printhead is parked and subjected to described droplet measurement, and as soon as a new, ensuing substrate is ready, the measurement progress is stored, the printhead returned to active printing duty, and so forth; when this ensuing substrate is finished, the printhead is once again returned to the maintenance station (while a new substrate is loaded) to begin measurement where the system previously left off. In this manner, repeated measurements can be collected for nozzles and used on a rolling basis to build a statistical distribution for each print nozzle or nozzle-waveform combination through many measurements (e.g., as described in the aforementioned patent applications which have been incorporated by reference), using a moving measurement window that precesses circularly through the set of all print nozzles so as to continuously update measurement data.

Note that all of the process steps recited above (as well as below) can be implemented in a number of manners. For example, in one embodiment, these steps are performed by one or more computers or other types of machines (such as a printer or one or more manufacturing devices), either by special purpose hardware or by general purpose hardware that is configured to operate as a special purpose machine. For example, in one contemplated design, one or more of the tasks can be performed by one or more such machines acting under the control of instructions stored on non-transitory machine-readable media, e.g., firmware or software. Such instructions are written or designed in a manner that has certain structure (architectural features) such that, when they are ultimately executed, they cause the one or more general purpose machines (e.g., a processor, computer or other machine) to behave as a special purpose machine, having structure that necessarily performs described tasks on input operands to take actions or otherwise produce outputs. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory and other tangible mechanisms where instructions may subsequently be retrieved by a machine. The machine-readable media can be in standalone form (e.g., a program disk) or embodied as part of a larger mechanism, for example, a laptop computer, portable device, server, network, printer, or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors, depending on embodiment. Throughout this disclosure, various processes will be described, any of which can generally be implemented as instructions stored on non-transitory machine-readable media, and any of which can be used to fabricate products using a "3D printing" or other printing process. Depending on product design, such products can be fabricated to be in saleable form, or as a preparatory step for other printing, curing, manufacturing or other processing steps, that will ultimately create finished products for sale, distribution, exportation or importation. Depending on implementation, the instructions on non-transitory machine-readable media can be executed by a single computer and, in other cases, can be stored and/or executed on a distributed basis, e.g., using one or more servers, web clients, or application-specific devices. Each function mentioned can be implemented as part of a combined program or as a standalone module, either stored together on a single media expression (e.g., single floppy disk) or on multiple, separate storage devices.

Note also that "clear" when used in connection with the film or tape is a relative term, i.e., it refers to the ability to capture an image of droplets deposited on a first side of the tape through a second side of the tape. This does not, strictly speaking, require the tape to be colorless or for that matter, transparent to visible light. In one embodiment, the tape is colorless and highly transparent to visible light, and visible light is used to capture an image of droplets from respective nozzles, where those droplets are deposited in a manner such that respective nozzles' droplets are arrayed on the first side of the tape (i.e., at respective positions correlated with the respective nozzles). In another embodiment, the tape has some degree of color, for example, optimized to a specific ink so as to enhance image capture properties of that ink. In yet another embodiment, radiation other than visible light is used to capture droplet properties.

Various other features will be apparent to those skilled in the art from the description herein. Having thus introduced features of several embodiments, this disclosure will now turn to providing additional detail regarding select embodiments.

FIG. 1 shows a flow diagram 101 that illustrates some of the techniques described herein. As indicated above, it is desired to concurrently measure values of droplet parameters for droplets produced by a multitude of nozzles. In order to perform this as rapidly as possible, embodiments disclosed herein rely on image capture of a deposition surface that receives such droplets (i.e., fast capture of droplets collectively representing the multiple nozzles), and image processing that computes values of one or more desired parameters respective to the multiple nozzles from this image capture. As noted by reference numeral 103, the printhead or printheads under analysis cause a range or array of nozzles to fire, to each thereby deposit one or more droplets. To provide an example, it could be that a hypothetical printhead has two thousand nozzles, and that these nozzles are to be measured in groups of one hundred nozzles at a time. For each measurement iteration, the printhead and/or the droplet measurement system are aligned, and the window or group of one hundred nozzles to be measured are identified and caused to fire a controlled ink volume substantially concurrently; in one embodiment, the deposition can be a single droplet per nozzle, and in other embodiments, a larger number of droplets can be controllably ejected from each nozzle, for example, 2, 5, 10, 12, 20 or some other number of droplets. Note that in some contemplated designs (e.g., OLED applications), droplet size is typically quite small, comprising picoliter ("pL") size droplets that are tens of microns in diameter or smaller, deposited with near-micron precision.

As noted in the aforementioned patent applications incorporated by reference, depending on application, it may be desired to measure position of deposited droplets, droplet velocity, droplet volume, nozzle bow, or one or more other parameters for each nozzle. Briefly, in one embodiment, it is important to have an expectation of droplet qualities from each nozzle for each deposited droplet; this is to say, if one nozzle relative to others is off position (nozzle bow) or produces aberrant droplet trajectory or an inaccurate droplet volume, then this could lead to nonuniformity in a deposited film. Such nonuniformity can lead to quality defects in precision products, for example, display devices and the like. An understanding nozzle-by-nozzle of such aberration permits:

(a) nozzle qualification/disqualification—a nozzle that does not work or otherwise has aberrant characteristics can be identified and not used in printing, with software planning printing in a manner where a different nozzle is used to deposit a droplet in the desired area;

(b) firing time mitigation—a positional defect in the scanning direction can be potentially corrected by changing a nozzle drive pulse as to timing or voltage, for example, such that the nozzle fires earlier or later, or ejects droplets with a greater or lesser velocity; in addition, it is also possible to use alternate drive pulse shapes as disclosed in the aforementioned patent applications which have been incorporated by reference;

(c) planned droplet combinations—detected differences from nozzle-to-nozzle can be accepted and deliberately used in calculating droplet combinations based on respective, expected values, to achieve a precise result, e.g., within a specific tolerance; for example, if one nozzle is measured and determined to produce expected 9.89 picoliter (pL) droplets, a second nozzle is measured and determined to produce expected 10.11 pL droplets and it is desired to produce a total volume of 20.00 pL ink in a specific target location, these two nozzles can be specifically identified and printing planned to deposit this specific droplet combination; note that obtainable results are different from a system that simply averages out differences without regard to a specific fill volume or fill tolerance (e.g., a target volume±0.50%); and (d) prescreening of drive waveforms—as noted in the aforementioned patent applications which have been incorporated by reference, it is possible to prescreen programmable drive waveforms for each nozzle (e.g., a choice of sixteen preselected drive waveforms) for stock use during printing, each waveform selected to achieve a specific deposition characteristic, with precision, expected results.

Note that droplet parameters can potentially vary from day-to-day, and even from deposition-to-deposition, e.g., dependent on ink qualities, temperature, nozzle age (e.g., clogging) and other factors. To ensure precision printing therefore, in some implementations, it can be desired to remeasure these values from time-to-time. Note also that each deposited droplet, even from a single nozzle, can be slightly different; in one embodiment therefore, each nozzle (or nozzle-waveform combination or pairing) is measured not just once, but multiple times, to develop a population of measurements, from which a mean or other statistical parameter (e.g., a spread measure) can be computed so as to provide a high confidence regarding expected values for droplet parameters. For example, "24" droplets from each nozzle-waveform pairing could be measured to develop means (and thus an expected value for) volume, velocity, bow (position orthogonal to scanning direction), and so forth, with the number of measurements n (n=24) helping reduce uncertainty due to measurement error or statistical variation. A given population can be updated on a rolling basis (e.g., all measurements stored and 6 newest measurements replacing 6 oldest for each nozzle every two hours), or on an at-once basis (e.g., all nozzles remeasured at once during power-up). There are many variations that will occur to those skilled in the art, e.g., a nozzle can be measured to determine an expected value and the nozzle disqualified from use if this measured (expected) value is outside of a band that is ±5% of an ideal value; many permutations and variations are clearly possible.

As should be apparent, however, in a printing system that uses thousands of nozzles (e.g., tens of thousands of nozzles or more, perhaps each with multiple available "prescreened" drive waveforms), measurement of expected droplet parameters for each nozzle could potentially take substantial time; in an industrial fabrication environment, this is typically unacceptable, i.e., to be commercially viable, manufacturing throughput and costs need to produce products at an acceptable consumer price point, and this typically means that the print process produces as many products as possible, with as great an accuracy (and as little product waste) as possible, with as little down time as possible. The techniques disclosed herein permit much more rapid and, thus, feasible measurement.

Returning to FIG. 1, to this effect, the droplet measurement techniques presented by this disclosure also capture droplets from many nozzles at once, per numeral 105. That is to say, as contrasted with systems that image droplets in flight "one-at-a-time," embodiments presented by this disclosure rely on concurrency to measure as many nozzles as possible at the same time. Thus, image capture can be used to effectively take a picture of droplets from a large array of nozzles, e.g., droplets deposited in multiple columns and in multiple rows, which are quickly processed in software by an image processing system. In one embodiment, a captured image can represent droplets from dozens, and potentially hundreds of nozzles (or more), all measured at the same time. FIG. 1 indicates in dashed-line boxes various options that can contribute to this end, for example, (a) capturing images through the deposition surface opposite the printhead (107), which helps speed measurement, (b) capturing droplets and nozzles both in a captured image at the same time (109), which facilitates measurement of positional offset, bow, or velocity for droplets from respective nozzles, (c) photographing droplets from respective (multiple) nozzles at the same time (111), e.g., effectively measuring forty or more nozzles at once, and (d) photographing not one droplet per nozzle, but an aggregation of multiple droplets, e.g., 5 or more, measured at the same time. Note that in the latter case, image processing software can detect volume of an aggregate deposition (e.g., volume), or spread in terms of droplet position around an expected position, and can identify individual droplets, mean, or another statistical parameter such as distribution (spread) at once from a single captured image. Note that this may require, depending on embodiment, that a standard be measured in advance and stored in the system; for example, as ink droplets are fixed into the deposition medium (i.e., the tape), it may be difficult to detect droplet volume; such a determination can be predicated on droplet diameter, processing of color (or grayscale) value of a deposited droplet, or using other means, with these values compared to a calibration standard in order to produce accurate value computation.

As noted by numerals 115 and 117, the system (e.g., using an image processor running appropriate software) then calculates measured values and stores these in memory (e.g., random access memory such as in an available hard disk drive). In one embodiment, these values are stored individually (i.e., one for each measurement for each parameter being measured for each nozzle) and in another embodiment, they can be stored in a manner representing a composite distribution (e.g., as a mean, total number of measurements, standard deviation, etc., for a given parameter for a given nozzle). Per numerals 119, 121 and 123, as noted earlier, the values once measured can be optionally used to compute a statistical distribution, to perform nozzle qualification/validation, and to perform "smart combinations" where print scans are planned to match droplets with expected characteristics in some desired manner.

FIGS. 2-4B are used to describe one embodiment of a modular droplet measurement system.

Figure 2:
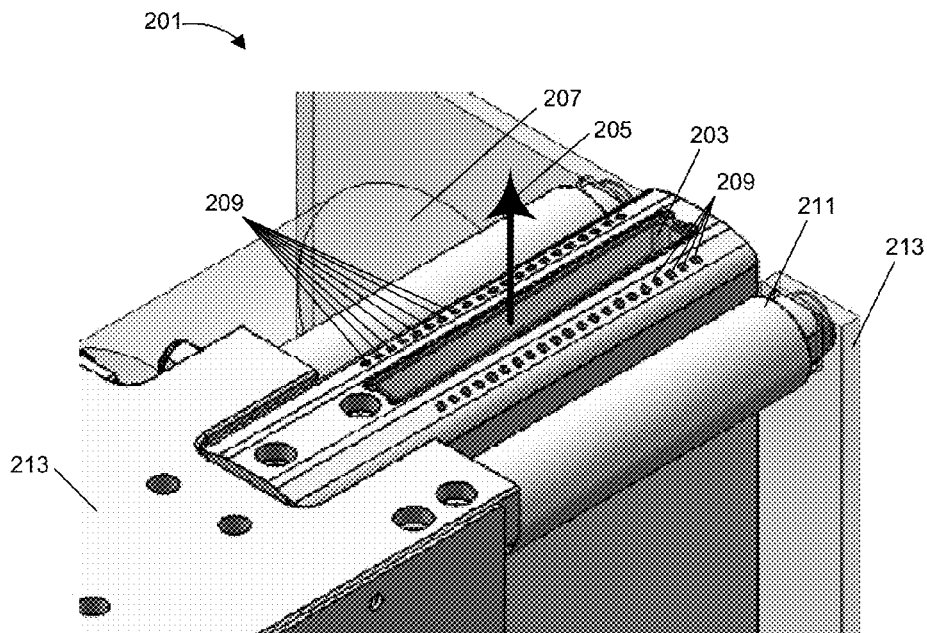
FIG. 2 is a close-up perspective view of a droplet measurement system.

FIG. 2 shows a close up view of a first such system 201. This view depicts a measurement window 203 (e.g., a glass-covered view window) through which images are captured along a vector represented by numeral 205. An optical detector, for example a camera, lies within system 201 and takes pictures through this window 203 along the direction of arrow 205. During operation, a clear film tape from roll 207 is advanced over this window and is held tight against the window by a set of vacuum ports 209. Following each measurement, this tape can be advanced in the direction of capstan 211 and accumulated in a discard roll (not seen) held within a chassis 213 of the droplet measurement system. Note that the depicted system is modular and is moved as a unit, e.g., to position the measurement window 203 (and associated measurement area defined by this window) in close proximity to any printhead nozzles to be measured, at a "standard deposition depth" relative to a nozzle plate of the printheads. In optional embodiments, the droplet measurement system 201 can be articulated in three dimensions so that this system can be placed adjacent other nozzle sets and also so as to vary deposition height as desired.

Figure 3:
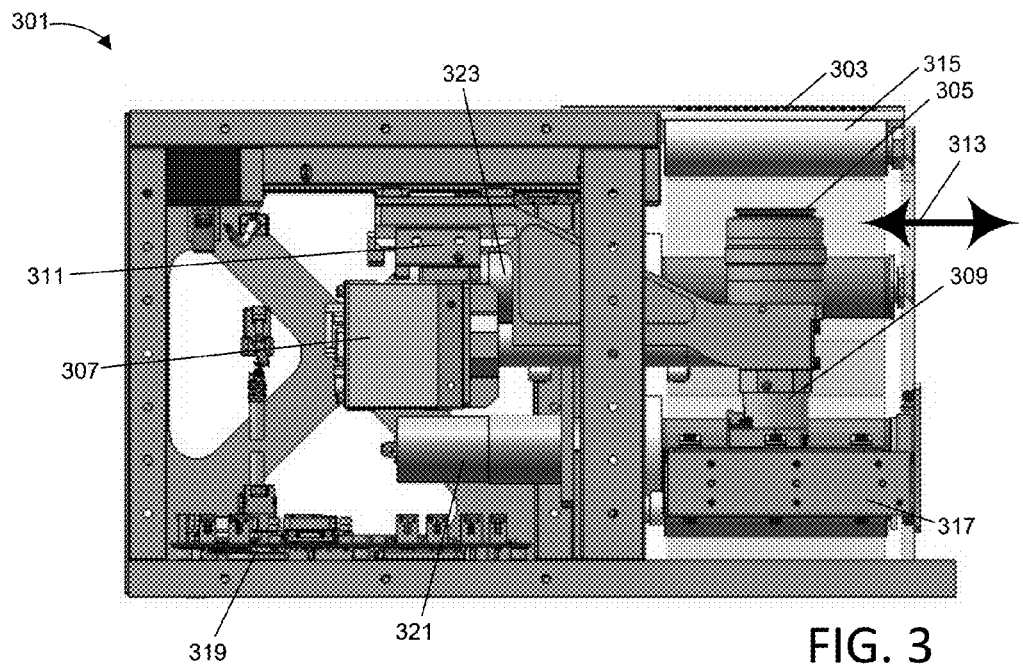
FIG. 3 is a cross-sectional view of a droplet measurement system.

FIG. 3 shows an interior, cross-sectional view of the droplet measurement system 301. This system similarly includes a view window 303 through which images are captured and an optics system comprising an optics assembly 305, a camera 307 and a light source 309. A stepper motor 311 selectively advances the optics assembly 305 linearly relative to the view window 303, i.e., back and forth in the direction indicated by arrows 313. Note that "camera" as used herein can optionally refer to any type of light sensor, i.e., it is possible to use a simple line sensor comprising individual optical sensors and for example to "scan" such a line sensor back and forth to image the entire viewing window 303 using this stepper motor 311. In other embodiment embodiments, the camera captures an image representing an array of pixels of the view area through any conventional means, e.g., using a commercial photographic camera, charge couple device array, an ultraviolet or other nonvisible radiation capture device, or with other means. Note that camera movement (i.e., scanning movement) is not required for all embodiments. In the depicted embodiment, the optics assembly 305 also internally comprises a beam splitter which passes light from the light source (e.g., up to the view window 303), but diverts returning (reflected) light using a mirror in the direction of the camera 307, for image capture. As should be apparent, light form the light source passes through the view window, through the clear tape, reflects against the printhead (not shown in FIG. 3), passes back again through the clear tape, and subject to any focusing or other optics, is captured and processed for analysis. A captured image thus provides visible indication of the position of each nozzle being measured (e.g., this image is captured from reflection by the nozzle plate) and also shows overlay of any deposited droplets (which are transparent, but distinguishable from the film). This is to say, in contemplated manufacturing processes (particularly for OLED display fabrication, e.g., for an encapsulation layer), deposition materials are translucent, and thus do not occlude image capture of the nozzle plate. FIG. 3 also shows a capstan 315 for transport of the clear tape and a UV curing bar 317 for curing any deposited ink, so as to prevent transfer of deposited ink to any other system component. FIG. 3 also shows an interface and control board 319, used for control over the various system components, and for control over image capture; the interface control board 319 also controls transport of the film tape, for example, by controlling film roll motors 321 and 323 respectively used for film intake and supply rolls (not separately identified this FIG.). Image processing can be, depending on embodiment, performed either locally on the interface and control board 319 or alternatively, at a processor in the manufacturing apparatus or at a remote computer.

Figure 4A:
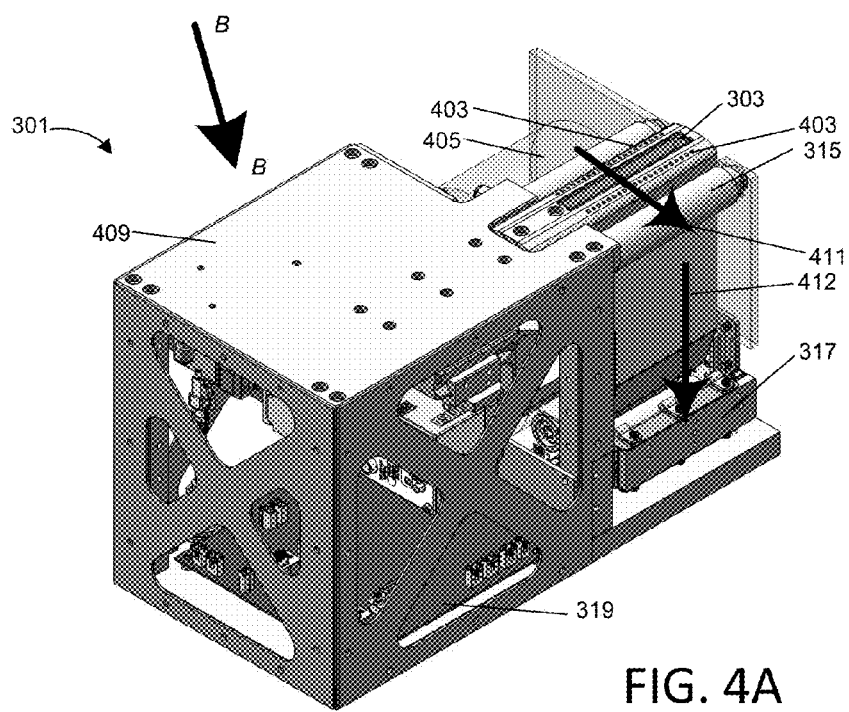
FIG. 4A is another perspective view of a droplet measurement system.
Figure 4B:
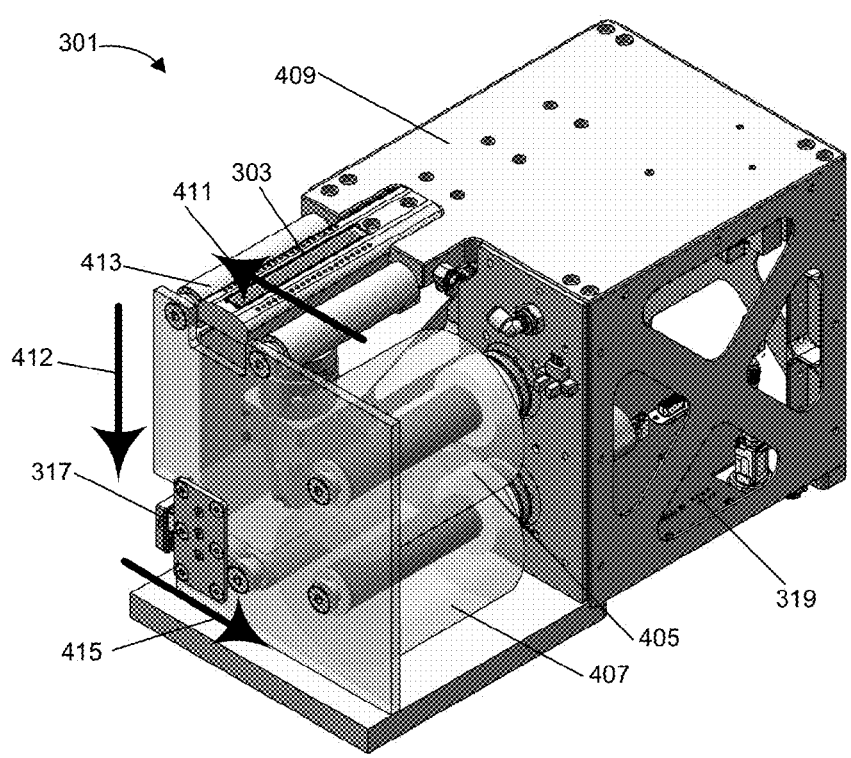
FIG. 4B is a perspective view of the droplet measurement system from FIG. 4A taken from the vantage point of arrow B-B in FIG. 4A.

FIGS. 4A and 4B show perspective views of the droplet measurement system 301 from FIG. 3. FIG. 4B represents a view of the backside of the unit relative to FIG. 4A, that is, from the vantage point provided by arrow B-B of FIG. 4A. More specifically, these FIGS. identify view window 303, vacuum ports 403, UV curing bar 317, a tape supply roll 405 and intake roll 407, a frame and optic chamber 409 (which houses the interface and control board 319, as described earlier). During operation, virgin tape is supplied in the direction indicated by arrow 411 and is adhered closely against the view window 303, as referenced earlier. From this point, the film is advanced over capstan 315 and downward toward the UV curing bar 317 along arrow 412, for the purposes described earlier. Operation of the UV curing bar is controlled by the interface and control board 319, using onboard firmware or software stored on non-transitory-machine readable media. Finally, following cure, film is advanced generally as indicated by arrow 415 to the intake roll 407. As should be apparent, the entire unit is modular, providing for easy removal and servicing, for example, to remove a finished intake roll 407 of clear deposition tape and to change the supply roll 405 to have fresh stock.

Figure 5A:
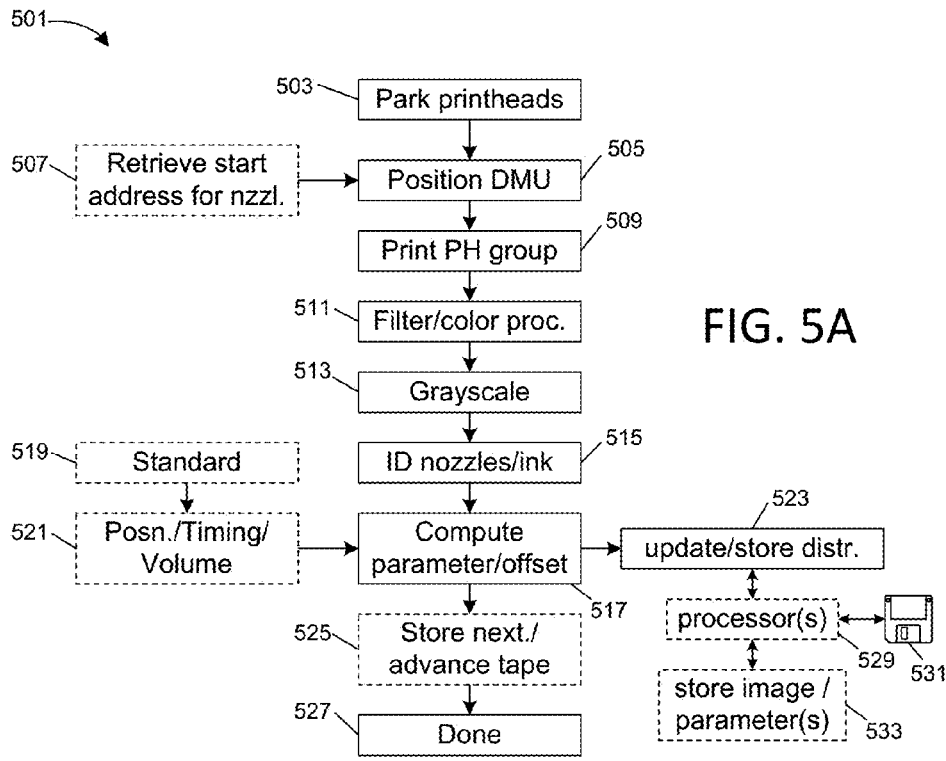
FIG. 5A is a flow chart associated with image processing techniques used in one embodiment.

FIG. 5A presents a flow chart associated with one embodiment 501 of a method of performing droplet measurement. As noted earlier, it can be desired to perform measurement in situ, that is, directly within a fabrication apparatus to dynamically update values of one or more droplet parameters for process, age, temperature, or other factors. To this end, measurement is advantageously performed in a service station of a printer, for example, while a new substrate is being loaded, unloaded, cured following deposition, or otherwise during idle time relative to actual printing. Per numeral 503, one or more printheads (for example, mounted to a common printhead assembly) are advanced to the service station and are "parked" for maintenance operations. Such maintenance operations can include various calibrations, printhead replacement, nozzle purging or other quality processing, droplet measurement as contemplated by this disclosure, or for other purposes. As will be described more fully below, for OLED display fabrication applications (and for fabrication of certain other devices, such as solar panels), it can be desired to perform printing in a controlled atmosphere; therefore, in many applications, the "parked" position will be in a second controlled atmospheric chamber, for example, in a location that can be externally accessed (e.g., for printhead replacement) without venting the entire fabrication apparatus or printer to an uncontrolled atmosphere. This is to say, such a second chamber is preferably made to be a small size relative to any printing enclosure, e.g., taking up two percent or less of the overall print chamber volume, so as to minimize venting (if any). Once the printheads are parked, they are sealed against this second controlled atmosphere and the droplet measurement system ("DMU," for droplet measurement unit) is selectively engaged to perform measurement (505). As noted by optional process block 507, if printing is performed on an intermittent basis for a moving window of nozzles (e.g., with different sets of nozzles measured or remeasured in between print runs, as substrates are loaded and unloaded as mentioned earlier), the system retrieves a start address so as to position the DMU to capture the selected subset of nozzles. Note that this process can employ a registration process to identify corner nozzles of each printhead (e.g., updated as a printhead is changed, such that the system is calibrated to "know" the approximate position of each nozzle). Such a registration process can be performed by articulating the DMU (and its camera) so as to image and thereby find the corner nozzles for each array, using an approximate positional address and search process (e.g., spiral search algorithm), for example, as described in U.S. patent application Ser. No. 14/340,403, referenced earlier. Control over positional throws is quite precise in the described system, e.g., to approximately one micron, and typically recalibration of printhead-to-droplet measurement system positioning is not required unless a system component is manually changed (for example, the DMU or a printhead is removed or serviced). With a clear tape (i.e., droplet deposition surface for testing) in place, per numeral 509, the system controls the printhead nozzles under scrutiny to each deposit a controlled number of droplets (in quick succession if multiple droplets are to be measured per-nozzle). Simultaneously, the image capture system within the DMU images deposited ink as well as nozzle locations (e.g., through the clear tape and the ink, capturing light reflected by the printhead). Note that as indicated by numeral 511, in one embodiment, image capture is performed in color so as to be able to identify concentration of ink in any deposited ink droplets (e.g., which, while translucent, will impart subtle color properties according to material or thickness). As also indicated by numeral 511, a captured image can be filtered (e.g., for color, intensity, gamma, or any other desired parameter or parameters) so as to yield a filtered image; following such filtering (or as part of such filtering), the captured image is converted to grayscale, per numeral 513. Note that multiple images can also be produced from this process according to respective filters, for example, a first image representing the nozzles and a second image representing deposited droplets; clearly, many permutations exist. Image processing software then uses the output grayscale image(s) to identify nozzles, ink droplets, positional differences between nozzles and ink droplets, droplet volume, droplet diameter, droplet shape, and/or any other desired parameters (515/517). As should be apparent, it is not necessary to all embodiments that all of these things be measured. For example, in a system which calculates droplet volume, it may not be necessary to image nozzles themselves, or to analyze droplet shape or position. Conversely, it may be important in such an embodiment (if spread of multiple droplets is being analyzed) to determine a measure of deviation in droplet position, or to perform color analysis to properly compute volume. The parameters that are measured will generally depend on implementation and desired results. As indicated by numeral 517, whatever the parameter to be measured, the system computes a measured value or values, or an offset for a parameter, for example using an optional standard 519, as referenced earlier. Such offset or value of a parameter can be computed for droplet or nozzle position, droplet timing, or droplet volume, or any combination of these things, as referenced by numeral 521. The system then updates a stored information repository that is local or remote to the DMU (523) and it then stores position for the next measurement iteration and advances the tape, per optional process 525. The process is then done, ready for another measurement iteration (which can be performed immediately, or at a later time, e.g., following an ensuing substrate run).

Note that as referenced by numerals 529-533, computation of the parameter and/or any positional offset can be optionally performed by one or more processors running suitable software (instructions stored on processor-readable media), and that such processors typically store image data in processor-accessible memory, isolate image data respective to each nozzle, calculate the parameter from the respective image data, and also store the per-nozzle parameter in processor-accessible memory.

Figure 5B:
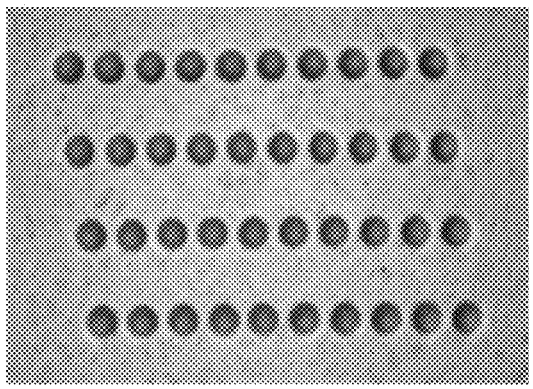
FIG. 5B is a sample captured image representing drops deposited on a medium, following conversion to grayscale.
Figure 5C:
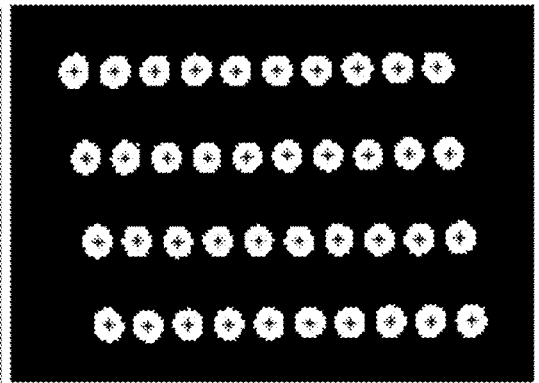
FIG. 5C is the captured image of FIG. 5B following filtering (e.g., gradient processing).

FIGS. 5B and 5C respectively show sampled images 551 and 571. The first of these, image 551, represents a photograph taken of approximately 40 nozzles as a subset of a printhead. Note how the nozzles are slightly staggered from row-to-row to provide options for close pitch variation in a cross scan axis (e.g., a droplet intended for a specific substrate position can be printed from any row of nozzles, providing depositional accuracy better than, i.e., less than, twenty microns in some embodiments). FIG. 5B represents a color image, which can then be filtered and/or converted to grayscale as appropriate, as well as a grayscale image following such filtering or conversion (i.e., color drawings are generally not used or permitted in patent applications). Note that in this embodiment, the nozzles are not separately imaged or illustrated, although for other embodiments, they can be. The second image 571 (FIG. 5C) represents the image from FIG. 5B, following filtering and gradient processing, to identify droplet diameters. That is to say, FIG. 5C shows white circles corresponding to droplet diameter, with clearly demarked droplet boundaries. Image processing calculates a center of gravity (for example, by calculating a horizontal maximum diameter and vertical maximum diameter of such "circles" and by taking the medial Cartesian coordinate point along each diameter, to associate each droplet with a specific xy Cartesian position). This position can then be compared to nozzle position to determine offset, with the system identifying nozzle-to-nozzle offset variation, for purposes of print planning. These photographs can also represent droplet volume processing; for example, image processing software can compute diameter and/or area of each droplet and/or associated color, and compare this to a factory-defined standard or an in situ-defined standard, to compute size and density and, from these, to compute volume. Nearly any desired droplet parameter can be measured in this way.

With the particulars of a droplet measurement system thus described, application to manufacture and to an industrial fabrication apparatus/printer will now be described. In the discussion below, an exemplary system for performing such printing will be described, more specifically, applied to the manufacture of solar panels and/or display devices that can be used in electronics (e.g., as smart phone, smart watch, tablet, computer, television, monitor, or other forms of displays). The manufacturing techniques provided by this disclosure are not limited to this specific and, for example, can be applied to any 3D printing application and to a wide range of other forms of products.

Figure 6A:
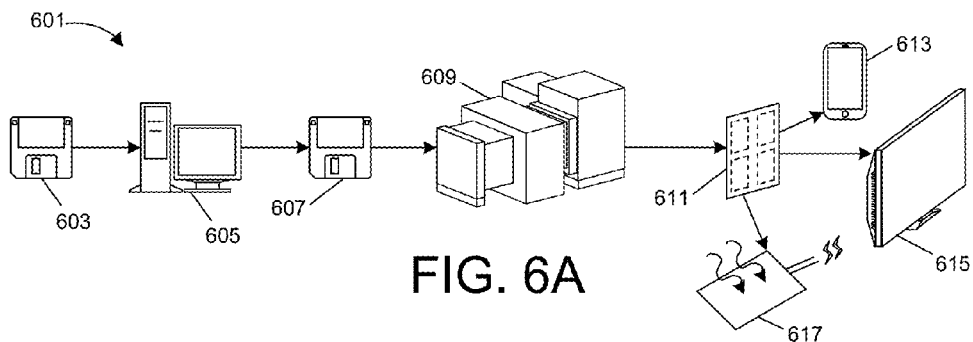
FIG. 6A is an illustrative diagram showing manufacturing tiers associated with product fabrication; the techniques disclosed herein can be implemented, without limitation, in any of the depicted tiers.

FIG. 6A represents a number of different implementation tiers, collectively designated by reference numeral 601; each one of these tiers represents a possible discrete implementation of the techniques introduced herein. First, techniques as introduced in this disclosure can take the form of instructions stored on non-transitory machine-readable media, as represented by graphic 603 (e.g., executable instructions or software for controlling a computer or a printer). For example, the disclosed techniques can be embodied as software adapted to cause a manufacturing apparatus (or included printer) to measure one or more droplet parameters using optical measurement techniques disclosed herein. Second, per computer icon 605, these techniques can also optionally be implemented as part of a computer or network, for example, within a company that designs or manufactures components for sale or use in other products. Third, as exemplified using a storage media graphic 607, the techniques introduced earlier can take the form of a stored printer control instructions, e.g., that, when acted upon, will cause a printer to fabricate one or more layers of a component in a manner dependent on droplet measurement and associated planning (e.g., scan path planning or nozzle qualification, as discussed herein). Note that printer instructions can be directly transmitted to a printer, for example, over a LAN or WAN; in this context, the depicted storage media graphic can represent (without limitation) RAM inside or accessible to a server, portable device, laptop, another form of computer or a printer, or a portable media such as a flash drive. Fourth, as represented by a fabrication device icon 609, the techniques introduced above can be implemented as part of a fabrication apparatus or machine, or in the form of a printer within such an apparatus or machine (e.g., as a droplet measurement system according to techniques disclosed herein, as a method of manufacture, as software for controlling a droplet measurement system, and so forth). It is noted that the particular depiction of the fabrication device 609 represents one exemplary printer device that will be discussed in connection with FIGS. 6B, 7A and 7B, below. The techniques introduced above can also be embodied as a completed or partially-completed manufactured component or an assembly of manufactured components (e.g. manufactured pursuant to a patented process); in FIG. 6A for example, several such components are depicted in the form of an array 611 of semi-finished flat panel devices, that will be separated and sold for incorporation into end consumer products. The depicted devices may have, for example, one or more encapsulation layers or other layers fabricated in dependence on the methods introduced above. The techniques introduced above can also be embodied in the form of end-consumer products as referenced, e.g., in the form of display screens for portable digital devices 613 (e.g., such as electronic pads or smart phones), as television display screens 615 (e.g., OLED TVs), solar panels 617, or other types of devices.

Figure 6B:
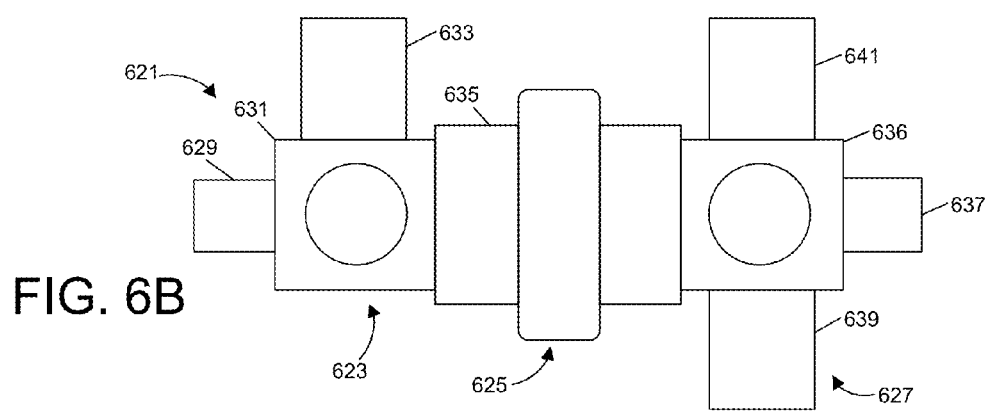
FIG. 6B shows a fabrication apparatus in plan view.

FIG. 6B shows one contemplated multi-chambered fabrication apparatus 621 that can be used to apply techniques disclosed herein. Generally speaking, the depicted apparatus 621 includes several general modules or subsystems including a transfer module 623, a printing module 625 and a processing module 627. Each module maintains a controlled environment, such that printing for example can be performed by the printing module 625 in a first controlled atmosphere and other processing, for example, another deposition process such an inorganic encapsulation layer deposition or a curing process (e.g., for printed materials), can be performed in a second controlled atmosphere. The apparatus 621 uses one or more mechanical handlers to move a substrate between modules without exposing the substrate to an uncontrolled atmosphere. Within any given module, it is possible to use other substrate handling systems and/or specific devices and control systems adapted to the processing to be performed for that module.

Various embodiments of the transfer module 623 can include an input loadlock 629 (i.e., a chamber that provides buffering between different environments while maintaining a controlled atmosphere), a transfer chamber 631 (also having a handler for transporting a substrate), and an atmospheric buffer chamber 633. Within the printing module 625, it is possible to use other substrate handling mechanisms such as a flotation table for stable support of a substrate during a printing process. Additionally, a xyz-motion system, such as a split axis or gantry motion system, can be used for precise positioning of at least one printhead relative to the substrate, as well as providing a y-axis conveyance system for the transport of the substrate through the printing module 625. It is also possible within the printing chamber to use multiple inks for printing, e.g., using respective printhead assemblies such that, for example, two different types of deposition processes can be performed within the printing module in a controlled atmosphere. The printing module 625 can comprise a gas enclosure 635 housing an inkjet printing system, with means for introducing an inert atmosphere (e.g., nitrogen) and otherwise controlling the atmosphere for environmental regulation (e.g., temperature and pressure), gas constituency and particulate presence.

Various embodiments of a processing module 627 can include, for example, a transfer chamber 636; this transfer chamber also has a including a handler for transporting a substrate. In addition, the processing module can also include an output loadlock 637, a nitrogen stack buffer 639, and a curing chamber 641. In some applications, the curing chamber can be used to cure, bake or dry a monomer film into a uniform polymer film; for example, two specifically contemplated processes include a heating process and a UV radiation cure process.

In one application, the apparatus 621 is adapted for bulk production of liquid crystal display screens or OLED display screens, for example, the fabrication of an array of (e.g.) eight screens at once on a single large substrate. These screens can be used for televisions and as display screens for other forms of electronic devices. In a second application, the apparatus can be used for bulk production of solar panels in much the same manner.

The printing module 625 can advantageously be used in such applications to deposit organic encapsulation layers that help protect the sensitive elements of OLED display devices. For example, the depicted apparatus 621 can be loaded with a substrate and can be controlled to move the substrate back and forth between the various chambers in a manner uninterrupted by exposure to an uncontrolled atmosphere during the encapsulation process. The substrate can be loaded via the input loadlock 629. A handler positioned in the transfer module 623 can move the substrate from the input loadlock 629 to the printing module 625 and, following completion of a printing process, can move the substrate to the processing module 627 for cure. By repeated deposition of subsequent layers, each of controlled thickness, aggregate encapsulation or other layer thickness can be built up to suit any desired application. Note once again that the techniques described above are not limited to encapsulation processes or to OLED fabrication, and also that many different types of tools can be used. For example, the configuration of the apparatus 621 can be varied to place the various modules 623, 625 and 627 in different juxtaposition; also, additional, fewer or different modules can also be used.

While FIG. 6B provides one example of a set of linked chambers or fabrication components, clearly many other possibilities exist. The techniques introduced above can be used with the device depicted in FIG. 6B, or indeed, to control a fabrication process performed by any other type of deposition equipment.

Figure 7A:
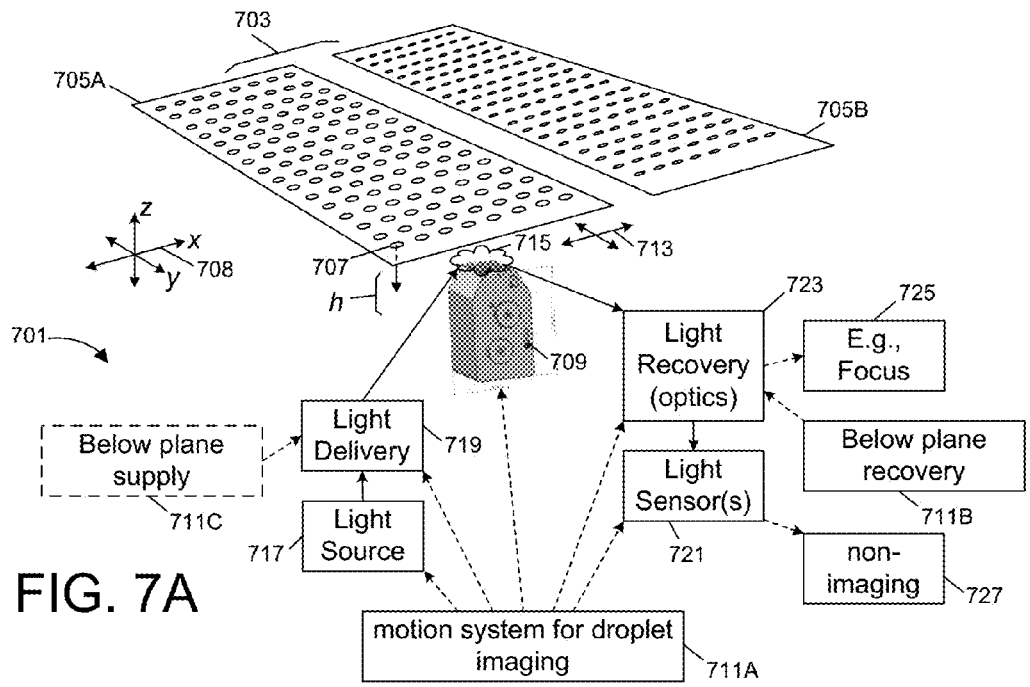
FIG. 7A is an illustrative representation regarding use of a droplet measurement system.
Figure 7B:
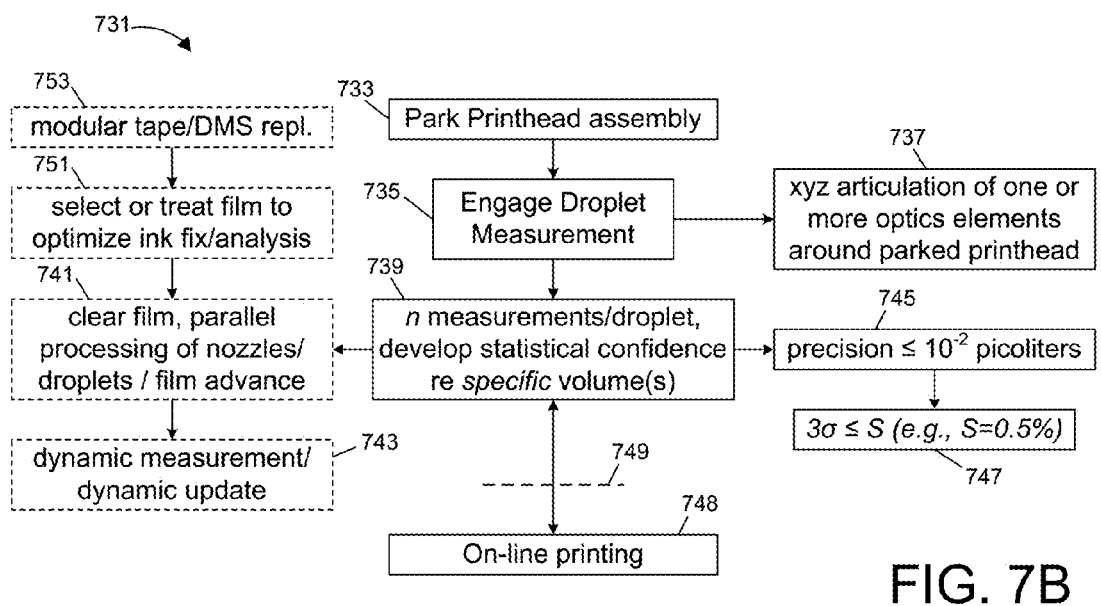
FIG. 7B is a flow chart relating to droplet measurement.
Figure 7C:
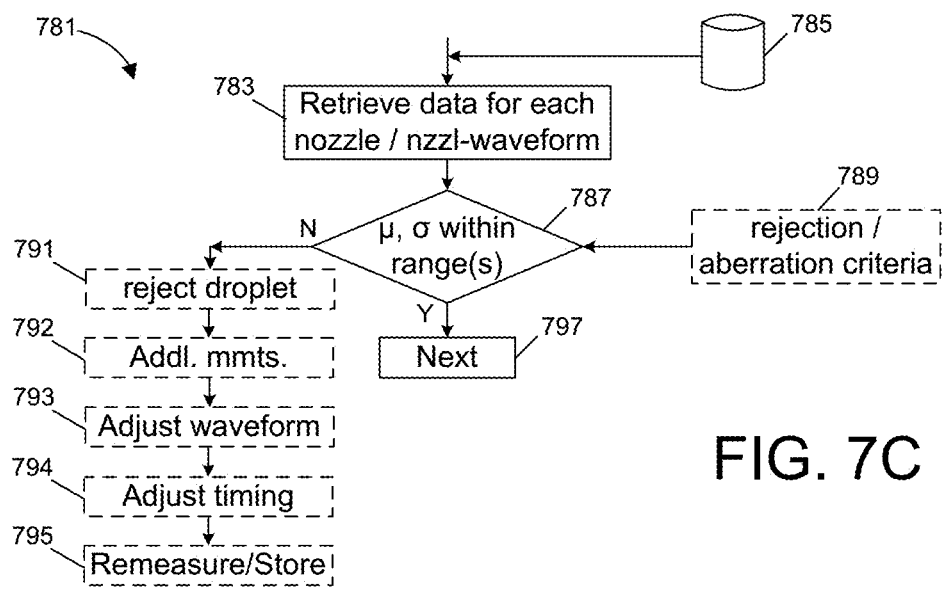
FIG. 7C is a flow chart relating to droplet validation.

FIGS. 7A-7C are used to generally introduce techniques and structures used for per-nozzle droplet measurement and validation.

More particularly, FIG. 7A provides an illustrative view depicting a droplet measurement system 701 and a relatively large printhead assembly 703; the printhead assembly has multiple printheads (705A/705B) each with a multitude of individual nozzles (e.g., 707), with hundreds-to-thousands of nozzles present. An ink supply (not shown) is fluidically connected with each nozzle (e.g., nozzle 707), and a piezoelectric transducer (also not shown) is used to jet droplets of ink under the control of a per-nozzle electric control signal. The nozzle design maintains slightly negative pressure of ink at each nozzle (e.g., nozzle 707) to avoid flooding of the nozzle plate, with the electric signal for a given nozzle being used to activate the corresponding piezoelectric transducer, pressurize ink for the given nozzle, and thereby expel droplets from the given nozzle. In one embodiment, the control signal for each nozzle is normally at zero volts, with a positive pulse or signal level at a given voltage used for a specific nozzle to eject droplets (one per pulse) for that nozzle; in another embodiment, different, tailored pulses (or other, more complex waveforms) can be used nozzle-to-nozzle. In connection with the example provided by FIG. 7A, however, it should be assumed that it is desired to measure a droplet volume produced by a specific nozzle or specific set of nozzles (e.g., nozzle 707) where a droplet is ejected downward from the printhead (i.e., in the direction "h," representing z-axis height relative to a three-dimensional coordinate system 708) toward a chassis 709 that mounts a deposition film. As noted earlier, for embodiments which use current droplet deposition from many nozzles, a target surface is advantageously both fixed in a known position relative to the printhead (e.g., such that it is known which deposited droplets belong to which nozzle). The dimension of "h" is typically on the order of one millimeter or less and that there are thousands of nozzles (e.g., 10,000 nozzles) that are to have respective droplets individually measured in this manner within an operating printer, with the deposition surface being changed or advanced in increments to multiple windows where many droplets (e.g. dozens to hundreds) will be simultaneously imaged and measured. Thus, in order to optically measure droplets from each nozzle with precision, certain techniques are used in disclosed embodiments to appropriately position elements of the droplet measurement system 701, the printhead assembly 703, or both relative to one another for optical measurement.

In one embodiment, these techniques utilize a combination of (a) x-y motion control (711A) of at least part of the optical system (e.g., within dimensional plane 713) to precisely position a measurement area 715 presented by the system immediately adjacent to any nozzle or set of nozzles that is to produce droplets for optical calibration/measurement and (b) below plane optical recovery (711B) (e.g., thereby permitting easy placement of the measurement area next to any nozzle notwithstanding a large printhead surface area). Thus, in an exemplary environment having about 10,000 or more print nozzles, this motion system is capable of positioning at least part of the optical system in (e.g.) 10,000 or so discrete positions proximate to the discharge path of each respective nozzle of the printhead assembly. Optics are typically adjusted in position so that precise focus is maintained on the measurement area so as to capture deposited droplets on a clear film or other deposition media, as mentioned. Note that a typical droplet may be on the order of microns in diameter, so the optical placement is typically fairly precise, and presents challenges in terms of relative positioning of the printhead assembly and measurement optics/measurement area. In some embodiments, to assist with this positioning, optics (mirrors, prisms, and so forth) are used to orient a light capture path for sensing below the dimensional plane 713 originating from the measurement area 715, such that measurement optics can be placed close to the measurement area without interfering with relative positioning of the optics system and printhead. This permits effective positional control in a manner that is not restricted by the millimeter-order deposition height h at which each droplet is deposited and imaged or the large scale x and y width occupied by a printhead under scrutiny. Optionally, separate light beams incident from different angles can be used to image a film or deposition surface from underneath, or a coaxial image capture system with a beam splitter can also be used. Other optical measurement techniques can also be used. In an optional aspect of these systems, the motion system 711A is optionally and advantageously made to be an xyz-motion system, which permits selective engagement and disengagement of the droplet measurement system without moving the printhead assembly during droplet measurement. Briefly introduced, it is contemplated in an industrial fabrication device having one or more large printhead assemblies that, to maximize manufacturing uptime, each printhead assembly will be "parked" in a service station from time to time to perform one or more maintenance functions; given the sheer size of the printhead and number of nozzles, it can be desired to perform multiple maintenance functions at once on different parts of the printhead. To this effect, in such an embodiment, it can be advantageous to move measurement/calibration devices around the printhead, rather than vice-versa. [This then permits engagement of other non-optical maintenance processes as well, e.g., relating to other nozzles if desired.] To facilitate these actions, the printhead assembly can be optionally "parked," as mentioned with the system identifying a specific group or range of nozzles that are to be the subject of optical calibration. Once the printhead assembly or a given printhead is stationary, the motion system 711A is engaged to move at least part of the optics system relative to the "parked" printhead assembly, to precisely position the measurement area 715 at a position suitable for detecting droplets jetted from a group of respective nozzles; the use of a z-axis of movement permits selective engagement of light recovery optics from well below the plane of the printhead, facilitating other maintenance operations in lieu of or in addition to optical calibration. Perhaps otherwise stated, the use of an xyz-motion system permits selective engagement of the droplet measurement system independent of other tests or test devices used in a service station environment. For example, in such a system, one or more printheads of a printhead assembly can also selectively be changed while the printhead is parked. Note that this structure is not required for all embodiments; other alternatives are also possible, such in which only the printhead assembly moves (or one of the printheads is moved) and the measurement assembly is stationary or in which no parking of the printhead assembly is necessary.

Generally speaking, the optics used for droplet measurement will include a light source 717, an optional set of light delivery optics 719 (which direct light from the light source 717 to the measurement area 715 as necessary), one or more light sensors 721, and a set of recovery optics 723 that direct light used to measure the droplet(s) from the measurement area 715 to the one or more light sensors 721. The motion system 711A optionally moves any one or more of these elements together with the chassis 709 (e.g., together with the imaging area) in a manner that permits the direction of post-droplet measurement light from the measurement area 715 to a below-plane location. In one embodiment, the light delivery optics 719 and/or the light recovery optics 723 use mirrors that direct light to/from measurement area 715 along a vertical dimension parallel to droplet travel, with the motion system moving each of elements 709, 717, 719, 721 and 723 as an integral system during droplet measurement; this setup presents an advantage that focus need not be recalibrated relative to measurement area 715. As noted by numeral 711C, the light delivery optics are also used to optionally supply source light from a location below the dimensional plane 713 of the measurement area, e.g., with both light source 717 and light sensor(s) 721 directing/collecting light from beneath the measurement area, as generally illustrated. As noted by numerals 725 and 727, the optics system can optionally include lenses for purposes of focus, as well as photodetectors (e.g., for non-imaging techniques that do not rely on processing of a many-pixeled "picture"). Note once again that the optional use of z-motion control over the chassis permits optional engagement and disengagement of the optics system, and precise positioning of measurement area 715 proximate to any group of nozzles, at any point in time while the printhead assembly is "parked." Such parking of the printhead assembly 703 and xyz-motion of the optics system 701 is not required for all embodiments. Other combinations and permutations are also possible.

FIG. 7B provides flow of a process associated with droplet measurement for some embodiments. This process flow is generally designated using numeral 731 in FIG. 7B. More specifically, as indicated by reference numeral 733, in this particular process, the printhead assembly is first parked, for example, in a service station (not shown) of a printer or deposition apparatus. A droplet measurement device is then engaged (735) with the printhead assembly, for example, by selective engagement of part or all of a droplet measurement system through movement from below a deposition plane into a position where an optics system of the droplet measurement system is capable of measuring droplets from many nozzles concurrently. Per numeral 737, this motion relative of one or more optics-system components relative to a parked printhead can optionally be performed in x, y and z dimensions.

As indicated in the aforementioned patent applications which have been incorporated by reference, even a single nozzle and associated nozzle firing drive waveform (i.e., pulse(s) or signal level(s) used to jet a droplet) can produce droplet volume, trajectory, and velocity that varies slightly from droplet-to-droplet. In accordance with teachings herein, in one embodiment, the droplet measurement system, as indicated by numeral 739, optionally obtains n measurements per droplet of a desired parameter, to derive statistical confidence regarding the expected properties of that parameter. In one implementation, the measured parameter can be volume, whereas for other implementations, the measured parameter can be flight velocity, flight trajectory, nozzle position error (e.g., nozzle bow) or another parameter, or a combination of multiple such parameters. In one implementation, "n" can vary for each nozzle, whereas in another implementation, "n" can be a fixed number of measurements (e.g., "24") to be performed for each nozzle; in still another implementation, "n" refers to a minimum number of measurements, such that additional measurements can be performed to dynamically adjust measured statistical properties of the parameter or to refine confidence. Clearly, many variations are possible. In connection with the system described earlier, a measurement population can be built up immediately (i.e., by taking multiple droplet measurements for a given nozzle array during a single measurement iteration, that is, without moving the droplet measurement system to a different nozzle set), or by taking a single measurement and building up a measurement population through later measurements (e.g., as measurement continually precesses through a circular range of nozzles over time).

For the example provided by FIG. 7B, it should be assumed that droplet volume is being measured, so as to obtain an accurate mean representing expected droplet volume from a given nozzle and a tight confidence interval. This enables optional planning of droplet combinations (using multiple nozzles and/or drive waveforms) while reliably maintaining distributions of composite ink fills in a target region about an expected target (i.e., relative to a composite of droplet means). As noted by optional process boxes 741 and 743, contemplated optical measurement processes ideally enable instantaneous or near instantaneous measurement and calculation of volume (or other desired parameter) of many nozzles at once, for example, using a clear film and below deposition plane capture (i.e., from an opposite side of the film to that used for deposition); with such fast-measurement, it becomes possible to frequently and dynamically update volume measurements, for example, to account for changes over time in ink properties (including viscosity and constituent materials), temperature, nozzle clogging or age and other factors. Building on this point, for example, with a 10,000 nozzle printhead assembly, it is expected that large measurement populations for each of the thousands of nozzles can be obtained in minutes, rendering it feasible to frequently and dynamically perform droplet measurement. As noted earlier, in one optional embodiment, droplet measurement (or measurement of other parameters, such as trajectory and/or velocity) can be performed as a periodic, intermittent process, with the droplet measurement system being engaged according to a schedule, or in between substrates (e.g., as substrates are being loaded or unloaded), or stacked against other assembly and/or other printhead maintenance processes, to effectively collect many data points (and thereby build a statistical distribution representing each nozzle) over many measurement intervals. Note that for embodiments that permit alternate nozzle drive waveforms to be used in a manner specific to each nozzle, such a rapid measurement system facilitates planned scan path adjustment, nozzle qualification/disqualifications, and planned droplet combinations of droplets produced by various nozzle-waveform pairings, as alluded to earlier and in the aforementioned patent applications which have been incorporated by reference. Per numerals 745 and 747, by measuring expected droplet volume to a precision of better than 0.01 pL, it becomes possible to plan for very precise droplet usage, where use of droplets can also be planned (ideally) to 0.01 pL resolution, and where measurement error in one embodiment is effectively reduced so as to provide for 3σ confidence (or other statistical measure, such as 4σ, 5σ, 6σ, etc.) relative to allowable droplet volume. The same is true for droplet position and/or velocity and/or nozzle bow. For example, by measuring expected position to a precision of better than one micron (or another distance measure), it becomes possible to provide for very precise depositions; expected position can be measured to a range of a specific Cartesian point and standard deviation (or, e.g., 4σ, 5σ, 6σ spread) around such a point). Once sufficient measurements are taken for various droplets, fills involving combinations of those droplets can be evaluated and used to plan printing (748) in the most efficient manner possible. As indicated by separation line 749, droplet measurement can be performed with intermittent switching back and forth between active "on-line" printing processes and "off-line" measurement and calibration processes; note that to minimize manufacturing system downtime, such measurement is typically performed while the printer is tasked with other processes, e.g., during substrate loading and unloading. Per numeral 751, in one embodiment, the clear film or tape can be specially selected (or treated) so as to optimize capture of droplet properties for the particular ink under analysis (i.e., given chemical or fluidic properties of that ink), for purposes of facilitating image capture and/or analysis. For example, the ink in some applications is a monomer that will later be cured by an ultraviolet light cure process to become a polymer; to facilitate capture of droplet properties, the clear film can be selected so as to have physical, color, absorbance, fixing, curing, or other properties to as to enhance the prevision with which such a material can be analyzed by the image capture system. Finally, per numeral 753, either the film (tape) or the droplet measurement system as a whole (or both) can be designed for modular replacement, so as to minimize measurement system and printing system downtime.

During printing, nozzle (and nozzle-waveform) measurement can be performed on a rolling basis, precessing through a range of nozzles with each break in between substrate print operations. Whether engaged to measure all nozzles anew, or on such a rolling basis, the same basic process of FIG. 7B can be employed for measurement. To this effect, when the droplet measurement device is engaged for a new measurement (either on the heels of prior measurement or on the heels of a substrate print operation), the system software loads a pointer which identifies the next nozzle set for which measurements are to be taken (e.g., for a second printhead, "nozzle window having an upper left corner at nozzle 2,312"). In the case of initial measurement (e.g., responsive to installation of a new printhead, or a recent boot-up, or a periodic process such as a daily measurement process), the pointer would point to a first nozzle for a printhead, e.g., "nozzle 2, 001." This nozzle either is associated with a specific imaging grid access or one is looked-up from memory. The system uses the provided address to advance the droplet measurement system (e.g., the measurement area referenced earlier) to a position corresponding to the expected nozzle position. Note that in a typical system, the mechanical throws associated with this movement are quite precise, i.e., to approximately micron resolution. The system optionally at this time searches for nozzle position about the expected micron-resolution position, and finds the nozzle and centers on its position based on image analysis of the printhead within a small micron-distance from the estimated grid position. For example, a zig-zag, spiral or other search pattern can be used to search about the expected position for a nozzle or fiducial bearing a predetermined positional relationship relative to the desired set. A typical pitch distance between nozzles might be on the order of 250 microns, whereas nozzle diameter might be on the order of 10-20 microns.

FIG. 7C provides a flow diagram relating to nozzle qualification. In one embodiment, droplet measurement is performed to yield statistical models (e.g., distribution and mean) for each nozzle and for each waveform applied to any given nozzle, for any of and/or each of droplet volume, velocity and trajectory. Thus, for example, if there are two choices of waveforms for each of a dozen nozzles, there are up to 24 waveform-nozzle combinations or pairings; in one embodiment, measurements for each parameter (e.g. volume) are taken for each nozzle or waveform-nozzle pairing sufficient to develop a robust statistical model. Note that despite planning, it is conceptually possible that a given nozzle or nozzle-waveform pairing may yield an exceptionally wide distribution, or a mean which is sufficiently aberrant that it should be specially treated. Such special treatment applied in one embodiment is represented conceptually by FIG. 7C.

More particularly, a general method is denoted using reference numeral 781. Data generated by the droplet measurement device is stored in memory 785 for later use. During the application of method 781, this data is recalled from memory and data for each nozzle or nozzle-waveform pairing is extracted and individually processed (783). In one embodiment, a normal random distribution is built for each variable to be qualified, as described by a mean, standard deviation and number of droplets measured (n), or using equivalent measures. Note that other distribution formats (e.g., Student's-T, Poisson, etc.), can be used. Measured parameters are compared to one or more ranges (787) to determine whether the pertinent droplet can be used in practice. In one embodiment, at least one range is applied to disqualify droplets from use (e.g., if the droplet has a sufficiently large or small volume relative to desired target, then that nozzle or nozzle-waveform pairing can be excluded from short-term use). To provide an example, if 10.00 pL droplets are desired, then a nozzle or nozzle-waveform linked to a droplet mean more than, e.g., 1.5% away from this target (e.g., <9.85 pL or >10.15 pL) can be excluded from use. Range, standard deviation, variance, or another spread measure can also or instead be used. For example, if it is desired to have droplet statistical models with a narrow distribution (e.g., $3\sigma<1.005\%$ of mean), then droplets with measurements not meeting this criteria can be excluded. It is also possible to use a sophisticated/complex set of criteria which considers multiple factors. For example, an aberrant mean combined with a very narrow spread might be okay, e.g., if spread (e.g., $3\sigma$) away from measured (e.g., aberrant) mean $\mu$ is within 1.005%, then an associated droplet can be used. For example, if it is desired to use droplets with $3\sigma$ volume within 10.00 pL±0.1 pL, then a nozzle-waveform pairing producing a 9.96 pL mean with ±0.8 pL $3\sigma$ value might be excluded, but a nozzle-waveform pairing producing a 9.93 pL mean with ±0.3 pL $3\sigma$ value might be acceptable. Clearly many possibilities are possible according to any desired rejection/aberration criteria (789). Note that this same type of processing can be applied for per-droplet flight angle and velocity, i.e., it is expected that flight angle and velocity per nozzle-waveform pairing will exhibit statistical distribution and, depending on measurements and statistical models derived from the droplet measurement device, some droplets can be excluded. For example, a droplet having a mean velocity or flight trajectory that is outside of 5% of normal, or a variance in velocity outside of a specific target could hypothetically be excluded from use. Different ranges and/or evaluation criteria can be applied to each droplet parameter measured and provided by storage 785.

Note that depending on the rejection/aberration criteria 789, droplets (and nozzle-waveform combinations) can be processed and/or treated in different manners. For example, a particular droplet not meeting a desired norm can be rejected (791), as mentioned. Alternatively, it is possible to selectively perform additional measurements for the next measurement iteration of the particular nozzle-waveform pairing; as an example, if a statistical distribution is too wide, it is possible to specially perform additional measurements for the particular nozzle-waveform pairing so as to improve tightness of a statistical distribution through additional measurement (e.g., variance and standard deviation are dependent on the number of measured data points). Per numeral 793, it is also possible to adjust a nozzle drive waveform, for example, to use a higher or lower voltage level (e.g., to provide greater or lesser velocity or more consistent flight angle), or to reshape a waveform so as to produce an adjusted nozzle-waveform pairing that meets specified norms. Per numeral 794, timing of the waveform can also be adjusted (e.g., to compensate for aberrant mean velocity associated with a particular nozzle-waveform pairing). As an example (alluded to earlier), a slow droplet can be fired at an earlier time relative to other nozzles, and a fast droplet can be fired later in time to compensate for faster flight time. Many such alternatives are possible. Finally, per numeral 795, any adjusted parameters (e.g., firing time, waveform voltage level or shape) can be stored and optionally, if desired, the adjusted parameters can be applied to remeasure one or more associated droplets. After each nozzle-waveform pairing (modified or otherwise) is qualified (passed or rejected), the method then proceeds to the next nozzle-waveform pairing, per numeral 797.

The schemes represented above can also be used to measure nozzle bow (and of course, to qualify or disqualify nozzles on this basis). That is, as an example, if it is assumed that a grouping of deposited droplets original from a single, common exact nozzle position, but are clustered off-center in the direction orthogonal to printhead substrate scanning motion, the nozzle in question could be offset relative to other nozzles in the same row or column. Such aberration can lead to idealized droplet firing deviations that can be taken into account in planning precise combinations of droplets, i.e., any such "bow" or individual nozzle offset is stored and used to qualify/disqualify nozzles or as part of print scan planning, as discussed earlier, with the printing system using the differences of each individual nozzle in a planned manner rather than averaging out those differences. In an optional variation, the same technique can be used to determine non-regular nozzle spacing along the printhead scanning direction (i.e., the fast print axis), although for the depicted embodiment, any such error is subsumed in correction for droplet velocity deviations (e.g., any such spacing error can be corrected for by adjustments to nozzle velocity, for example, effectuated by minor changes to a drive waveform used for the particular nozzle). To determine cross-scan-axis bow of a nozzle producing a cluster of droplets, the respective trajectories are effectively reverse plotted (or otherwise mathematically applied) with other measurement trajectories for the same nozzle and used to identify a mean cross-scan-axis position of the specific nozzle under scrutiny. This position may be offset from an expected location for such a nozzle, which could be evidence of nozzle bow.

As stated before and as implied by this discussion, one embodiment builds a statistical distribution for each nozzle for each parameter being measured, for example, for volume, velocity, trajectory, nozzle bow, and potentially other parameters. As part of these statistical processes, individual measurements can be thrown out or used to identify errors. To cite a few examples, if a droplet measurement is obtained having a value that is so far removed from other measurements of the same nozzle that the measurement could represent a firing or measurement error; in one implementation, the system discards this measurement if deviant to a point that exceeds a statistical error parameter. If no droplet is seen at all, this could be evidence that the droplet measurement system is at the wrong nozzle (wrong position), or has a firing waveform error or that a nozzle under scrutiny is inoperative. An error handling process can be employed to make appropriate adjustments including taking any new or additional measurements as necessary.

Note that, although not separately called out by FIGS. 7A-C, the depicted measurement process would typically be performed for each alternate waveform available for use with each nozzle. For example, if each nozzle had four different piezoelectric drive waveforms that could be selected, the measurement process might generally be repeated 4 times for each group of nozzles; if a particular implementation called for the building of a statistical distribution based on 24 droplets for each waveform, then there might be 96 such measurements for one nozzle (24 for each of four waveforms, with each measurement being used to develop statistical mean and spread measures for each of droplet velocity, trajectory and volume, and for estimated nozzle position (e.g., for purposes of assessing nozzle bow). In one contemplated embodiment, any number of waveforms can be shaped or otherwise generated, and the system measures droplet parameters associated with one or more preselected waveforms and then stores these parameters for later use in printing and/or print planning. These parameters can also be used in determining whether to keep (and store) the waveform for use in printing (e.g., as part of a preselected set of permissible waveforms), or to select a different waveform and measure parameters for that waveform.

Through the use of precision mechanical systems and droplet measurement techniques, the disclosed methodology permits very high accuracy measurement of individual nozzle characteristics, including mean droplet metrics for each of the mentioned parameters (e.g., volume, velocity, trajectory, nozzle position, and other parameters). As should be appreciated, the mentioned techniques facilitate a high degree of uniformity in manufacturing processes, especially OLED device manufacture processes, and therefore enhance reliability. By providing for control efficiencies, particularly as to speed of droplet measurement and the stacking of such measurement against other system processes in a manner calculated to reduce overall system downtime, the teachings presented above help provide for a faster, less expensive manufacturing process designed to provide both flexibility and precision in the fabrication process.

Figure 8A:
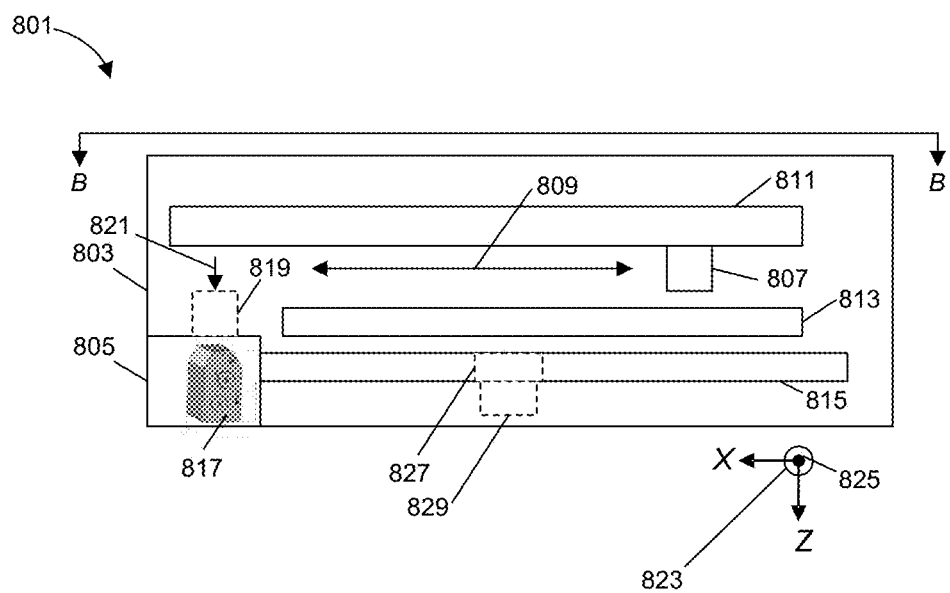
FIG. 8A is a cross-sectional representation of elements of an industrial printer, internal to a print chamber.

FIG. 8A shows a cross-sectional view of a typical layout within an industrial fabrication apparatus (e.g., associated with a printer in such an apparatus) 801. More specifically, printing is seen to be performed within a print enclosure chamber 803, such that an ambient atmosphere can be controlled ("controlled atmosphere"); such control is typically performed to exclude unwanted particulate, or otherwise to perform printing in the presence of a specific gas constituency (for example, nitrogen, a noble gas, etc.). Generally speaking, a substrate 813 is generally introduced into the printer using an atmospheric buffer chamber (not shown) and conveyed to a flotation support table 815 using a mechanical handler, which also aligns the substrate properly for printing via detection of one or more fiducials on the substrate (these fiducials and a camera or other optical detector used to detect precise substrate position are not shown in FIG. 8A). Printing is performed using a printhead assembly 807 which is moved back and forth (as depicted by arrows 809) along a traveler 811 in the direction of a "slow print axis." The printhead assembly 807 is depicted as a single object but may be a complex assembly that mounts multiple printheads (e.g., 6, 10 or another number), each one having hundreds to thousands of print nozzles (e.g., two thousand nozzles each). The printhead assembly 807 deposits a liquid ink onto the substrate 813 at precise position points to precise thicknesses, where the ink includes a material that will form a permanent layer of one or more products to be fabricated on the substrate 813. For example, such a material can be an organic or inorganic material, a conductor or insulator, a plastic, a metal, or some other type of material. In a typical application, the substrate 813 is more than one meter wide and several meters long and is used to simultaneously fabricate multiple OLED displays arrayed on the substrate; each layer is deposited as part of an integral print process across all such "subpanels" (i.e., across multiple such displays in-fabrication) with the individual displays eventually being cut from the substrate via another process. Each print process can deposit a different ink to a specified thickness, for example, conductors, insulators, light generating elements, semiconductor materials, encapsulation and so forth, using print instructions specific to the particular layer. In an assembly line process, there can be multiple printers arranged at different positions or used in successive, different deposition processes. For OLED materials, an ink is deposited for a particular layer, and following deposition, the substrate is removed from the chamber and advanced to a cure chamber (not shown) where the deposited ink can be cured, dried, heated or otherwise processed to impart permanency to deposited material. Note that the depicted arrangement represents a "split-axis" printer, i.e., the floatation table 815 and associated handlers (not shown) advance the substrate into and out of the drawing page, along the direction of a Y axis 825 seen at a dimensional reference 823 near the bottom right of the FIG.

To perform droplet measurement, the printhead assembly 807 is selectively advanced outside of a normal print area to a point where it may be parked in a service station, generally associated with a second enclosure environment 805. This second environment is optional, but is advantageous to permit inspection, printhead substitution and other maintenance forms without having to vent the print enclosure chamber 803. To park the printhead assembly 807, the assembly is moved to a location generally seen at the left side of the FIG., and is then advanced vertically in order to seal the printhead assembly 807 against a chamber for the second enclosure environment, as represented by dashed line position 819. In this "parked" position, the droplet measurement system 817 can be controlled (e.g., in three dimensions) to selectively transport a measurement area to mimic a substrate deposition height in proximity to any desired nozzle area.

Note that as referenced above, in a typical application, it is desired to keep the fabrication apparatus 801 "online" and in-use as much as possible. To this effect, rather than performing droplet measurement at a time when the apparatus 801 could be used for printing (and for product manufacture), in one embodiment, measurement and printing are "ping-ponged," i.e., each time a substrate (e.g., 813) is loaded or unloaded, during a time interval between print operations, the printhead assembly 807 is advanced to the service station and is partially calibrated (e.g., as to a rolling subset of print nozzles and/or print nozzle waveforms) in order to build a robust set of measurements for each nozzle, updated to be current, and maintained in a manner to develop statistical measurement populations, as described previously. Note that any one of these features may be considered optional, and is not essential for practice of the disclosed techniques.

Figure 8B:
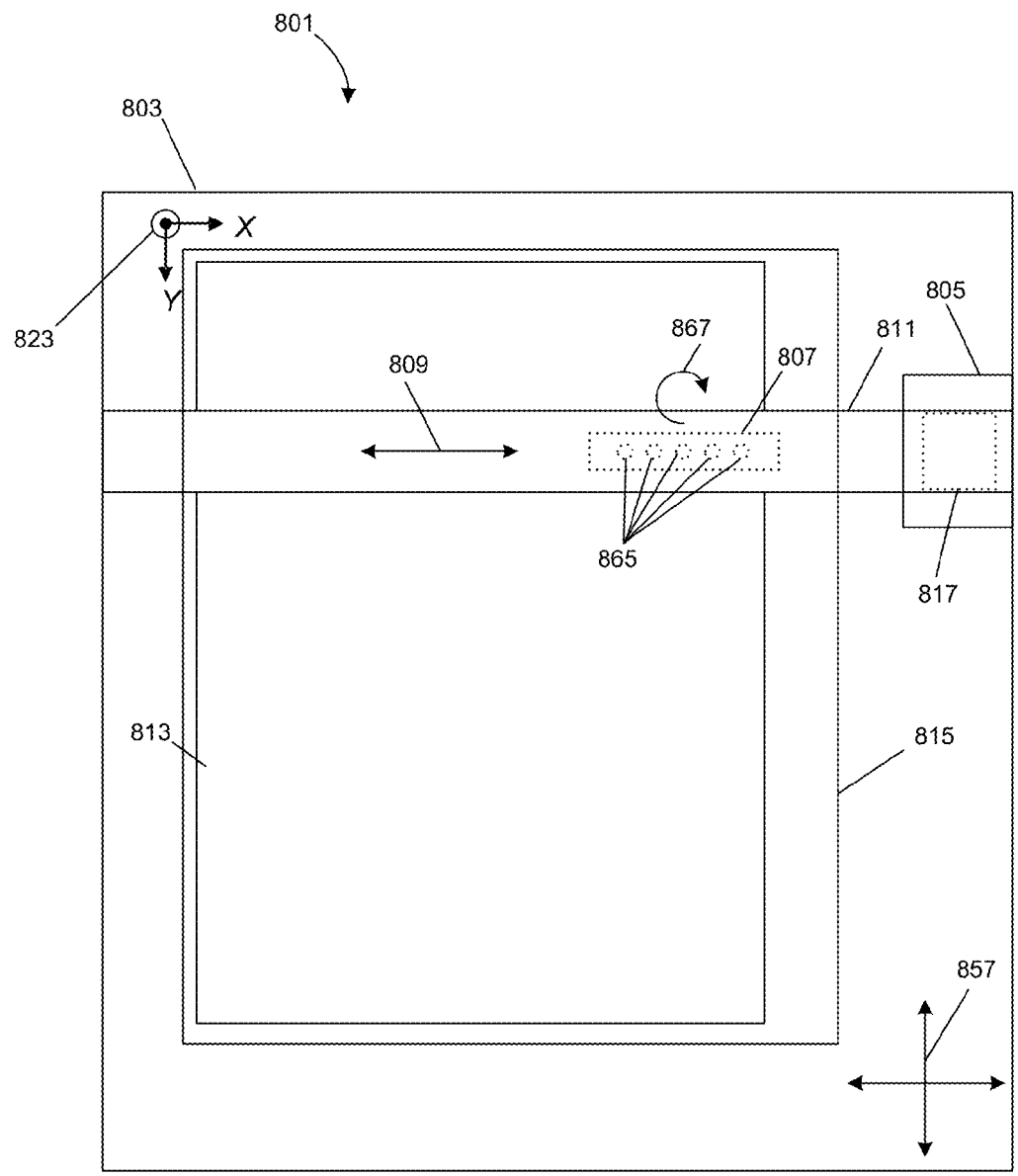
FIG. 8B is a cross-sectional representation of the industrial printer of FIG. 7A, taken along lines B-B in FIG. 8A.

FIG. 8B provides a plan view of the substrate and printer as they might appear during the deposition process, taken along lines B-B from FIG. 8A. The print enclosure chamber is once again generally designated by reference numeral 803, while the second enclosure environment used for droplet measurement is generally designated by reference numeral 805. Within the print enclosure chamber, the substrate to be printed upon is once again generally designated by numeral 813, and the support table used to transport the substrate is generally designated by numeral 815. Generally speaking, any xy coordinate of the substrate is reached by a combination of movements, including x- and y-dimensional movement of the substrate by the support table (e.g., using flotation support, as denoted by numeral 857) and using "slow axis" x-dimensional movement of one or more printheads 807 along a traveler 811, as generally represented by arrows 809. As mentioned, the flotation table and substrate handling infrastructure are used to move the substrate during printing along one or more "fast axes," as necessary. The printhead is seen to have plural nozzles 865, each of which is separately controlled by a firing pattern derived from a print image (e.g., to effectuate printing of columns corresponding to printer grid points as the printhead is moved from left-to-right and vice-versa along the "slow axis"); note that while only a few print nozzles are graphically depicted in the FIG., in practice, there are hundreds to many thousands of such nozzles, arranged in many columns and rows. With relative motion between the one or more printheads and the substrate provided in the direction of the fast axis (i.e., the y-axis), printing describes a swath that typically follows individual rows of printer grid points. The printhead assembly can also optionally be rotated or otherwise adjusted to vary effective nozzle spacing, per numeral 867. Note that multiple such printheads can be used together, oriented with x-dimension, y-dimension, and/or z-dimensional offset relative to one another as desired (see axis legend 823 in FIG. 8B). The printing operation continues until the entire target region (and any border region) has been printed with ink, as desired, with relative printhead assembly/substrate motion represented by the vertical element of depicted transport directions 857. Following deposition of the necessary amount of ink, the substrate is finished, such as via use of an ultraviolet (UV) or other cure or hardening process that forms a permanent layer from the liquid ink. As noted earlier, as substrates are loaded or unloaded for printing, the printhead is advanced to a maintenance station and is sealed to a second enclosure environment 805. In practice, this second enclosure environment as noted is made a subset of the print enclosure chamber 803, such that a printhead can be changed without having to vent the print enclosure chamber as a whole. Within the second enclosure environment 805, the droplet measurement system 817 (seen in dashed lines to lie below traveler 811) is selectively engaged (again, advantageously using three dimensional articulation of the droplet measurement system as a whole, e.g., of a chassis thereof), for measurement as referenced earlier.

Figure 9:
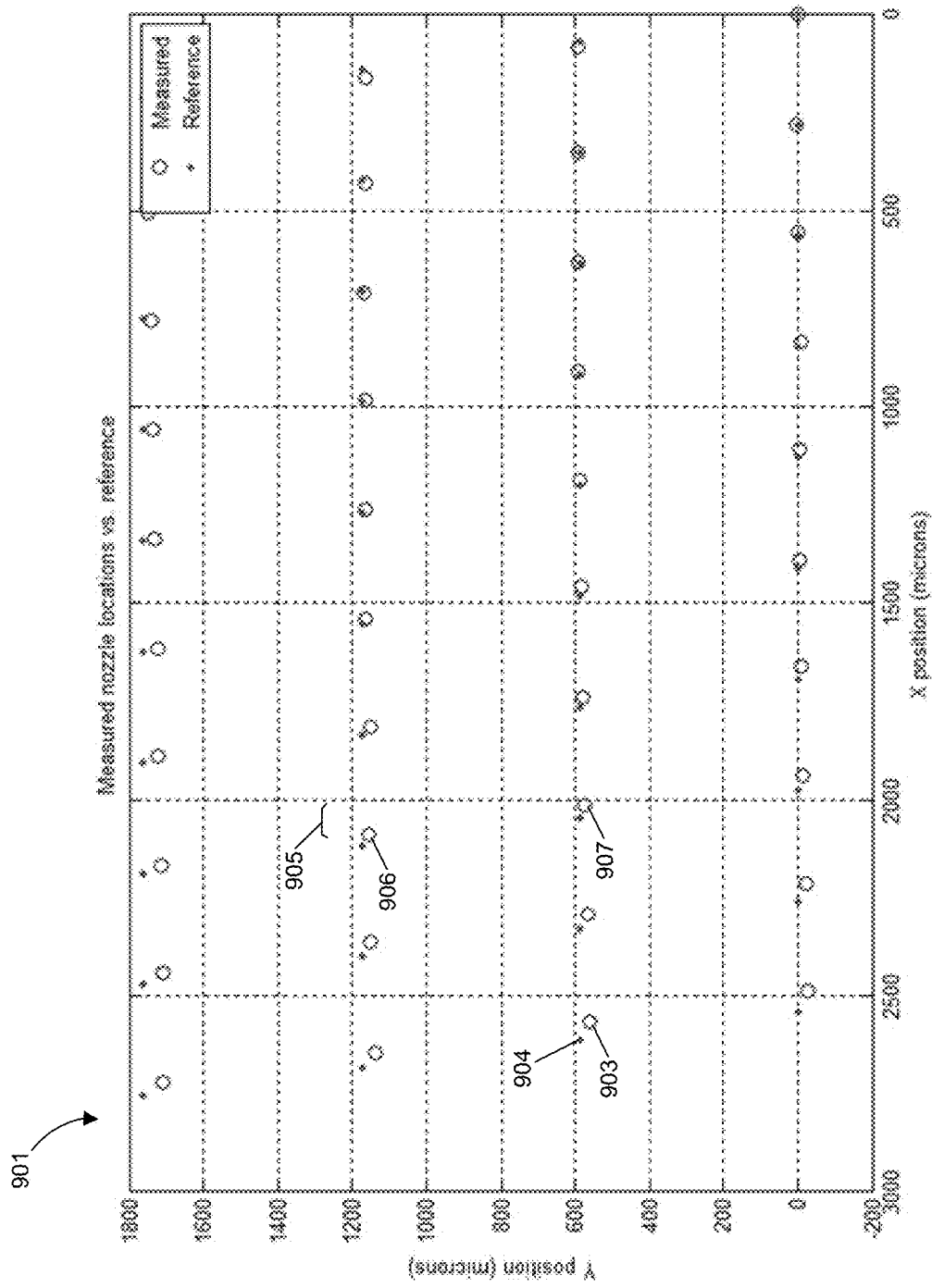
FIG. 9 is a diagram showing a comparison of measured droplet positions relative to respective expected positions.

FIG. 9 provides a chart that illustrates measured droplet positions relative to positions expected for those droplets for each of many nozzles. More specifically, the chart is generally designated by numeral 901 and shows a group of approximately 40 nozzles. It should be assumed that the chart 901 represents image data, for example, processed above as described with reference to FIGS. 6A-C in order to obtain a measured droplet position (i.e., such as position 903) relative to a corresponding expected position (i.e., such as position 904). Several features should be noted relative to FIG. 9. First, the nozzles are seen to be arranged in rows of nozzles that are slightly staggered in position, as represented by graphic 905; this feature permits very precise spacing of droplets, e.g., while manufacturing tolerances are such that nozzles are positioned in a cross-scan direction several hundred microns apart, slight staggering from row to row permits alternate nozzle usage (for example, the nozzle corresponding to position 906 relative to the nozzle corresponding to position 907, which permits very tight placement of droplets, e.g., to within 20 microns or less of any desired position on a substrate. Second, the chart 901 indirectly emphasizes benefits provided by positional calibration of the droplet measurement system relative to a printhead, e.g., it is important that the system know exactly which nozzle corresponds to position 903 and expected position 904, so as to be able to match any measured data (and any nozzle qualification or adjustment) with the correct nozzle. Through image processing, precise positional offsets can be determined for each nozzle, and factored into nozzle qualification and print planning. Finally, note again that the use of a clear film potentially permits image capture not only of deposited droplets, but of the nozzle as well (e.g., captured through the clear film), facilitating performance of distance analysis by software. This is not required for all embodiments, e.g., through an understanding of how the captured image of the film corresponds to nozzle plate position, the software can easily also infer nozzle position relative to the captured image, and on this basis compute positional offsets. In the context of FIG. 9, the numeral 904 in one embodiment represents image nozzle position with any deviation between measured position 903 and position 904 representing droplet velocity and/or bow. Also, while FIG. 9 represents positional offset of droplets relative to expected droplet position, similar analysis can also be used to measure droplet volume, for example, by comparing droplet color (e.g., grayscale value), droplet diameter, or other features of the captured image to a standard, and computing droplet volume therefrom. Through the use of repeated, additional measurements for each nozzle or nozzle-waveform pairing, the system can readily build distributions for any desired droplet parameter on a per-nozzle or per-nozzle waveform basis.

Figure 10:
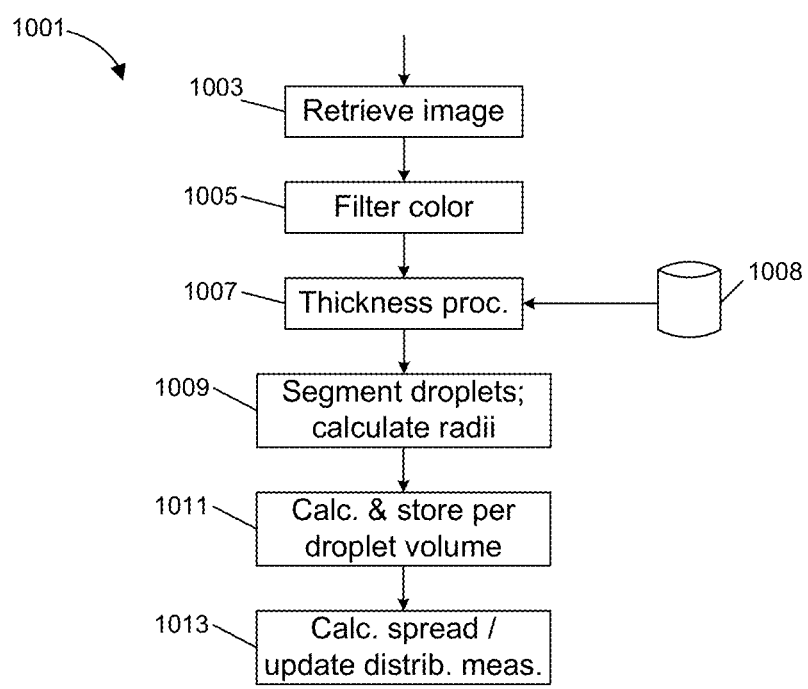
FIG. 10 is a flow chart relating to droplet volume computation.

FIG. 10 shows a flow diagram 1001 associated with determining droplet volumes from a captured image. Per numeral 1003, a captured image representing droplets produced by an array of nozzles is first retrieved from memory. This image is then filtered as appropriate to segment just the droplets of interest (e.g., with varying color intensity according to thickness or ink concentration on the deposited medium), per numeral 1005. Note that such the filtered image can be a first, second, third or other instance of filtration performed to measure a specific parameter from a single image (e.g., other instances can be used to computed distances, positions, offset, and so forth for droplet velocity, position, nozzle position and so forth). Per numeral 1007, any color hue is then processed to correlate that hue with ink thickness or density; for example, if deposited ink has a slightly reddish tint, then a "redder" portion of the image would typically represent greater thickness. Note that for embodiments where multiple droplets are deposited from each nozzle at-once, there can be multiple visible droplets that overlap, and thickness processing 1007 preferably takes this into account, segmenting any individual droplet; this is not required for all embodiments, e.g., if it is known that five droplets for example have been deposited, it might suffice to compute overall volume and to divide by five. Per numeral 1009, droplet radii are then calculated as referenced earlier (or aggregate ink coverage) and used in connection with the derived thickness measure to compute total deposited ink. Importantly, the clear film used as a deposition surface ideally fixes deposited ink and therefore may differ from an actual deposition surface used in active printing (e.g., a glass substrate); as depicted by numeral 1008 therefore, a stored standard specific to the deposition material is retrieved and used in connection with thickness processing, volume calculation 1011 or both to derive correct droplet volume estimates. Finally, measurement data is stored per numeral 1013 and any computed per-nozzle or per-nozzle-waveform distributions (e.g., mean and spread) are updated for use in print or scan planning. Note that analogous comparisons to a standard and raw value (or offset) computation can be applied for many other parameters other than volume, as suitable to the particular application.

Reflecting on the various techniques and considerations introduced above, a manufacturing process can be performed to mass produce products quickly and at low per-system cost. By providing for fast, repeatable printing techniques, it is believed that printing can be substantially improved, for example, reducing per-layer printing time to a small fraction of the time that would be required without the techniques above. Again returning to the example of large HD television displays, it is believed that each color component layer can be accurately and reliably printed for large substrates (e.g., generation 8.5 substrates, which are approximately 220 cm×250 cm) in one hundred and eighty seconds or less, or even ninety seconds or less, representing substantial process improvement. Improving the efficiency and quality of printing paves the way for significant reductions in cost of producing large HD television displays, and thus lower end-consumer cost. As noted earlier, while display manufacture (and OLED manufacture in particular) is one application of the techniques introduced herein, these techniques can be applied to a wide variety of processes, computer, printers, software, manufacturing equipment and end-devices, and are not limited to display panels.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

As indicated, various modifications and changes may be made to the embodiments presented herein without departing from the broader spirit and scope of the disclosure. For example, features or aspects of any of the embodiments may be applied, at least where practical, in combination with any other of the embodiments or in place of counterpart features or aspects thereof. Thus, for example, not all features are shown in each and every drawing and, for example, a feature or technique shown in accordance with the embodiment of one drawing should be assumed to be optionally employable as an element of, or in combination of, features of any other drawing or embodiment, even if not specifically called out in the specification. Accordingly, the specification and drawings are to be regarded in an illustrative rather than a restrictive sense.

We claim:

1. A modular system for use in measuring a parameter associated with droplet ejection by nozzles of a printhead in a printing system, the modular system comprising:
   a chassis for the modular system, the chassis defining a top surface and a window in the top surface;
   a film having a first side and a second side, the second side to be supported by the top surface, the first side to be positioned proximate to the printhead at a portion of the film between the printhead and the window, so as to provide a substrate to receive ink droplets from the nozzles;
   an image capture subsystem mounted by the chassis, the image capture subsystem positioned so as to capture a first image through the second side of the film and through the window, the first image representing a first plurality of the ink droplets received from a first set of respective nozzles of the printhead, the image capture subsystem to generate an output signal to convey the captured image representing the first plurality of the ink droplets to an image processing system; and
   a mechanism mounted by the chassis to advance the film relative to the chassis, so as to position a fresh portion of the film for an ensuing image capture process in which a second plurality of droplets are received on the first side of the film from a second set of the nozzles of the printhead, the advancement of the film not requiring repositioning of either the printhead or the image capture subsystem, the capture of the second plurality of the droplets not requiring repositioning of the image capture subsystem relative to the chassis;
   wherein the printer system is to transport said modular system as a unit relative to the printhead in order to capture said first image and said ensuing image.

2. The modular system of claim 1, wherein the modular system further comprises the image processing system, the image processing system having at least one processor and instructions stored on processor-readable media, the instructions when executed to cause the at least one processor to receive each of the first image and the ensuing image from the image capture subsystem, to store each such image in processor-accessible memory, to process each such image to associate respective identify image data representing each droplet of the respective first plurality and second plurality of droplets, to process each identified set of image data to calculate the parameter for each of the nozzles, and to store the parameter for each of the respective nozzles in processor-accessible memory.

3. The modular system of claim 2, wherein the instructions when executed are to cause the at least one processor to calculate the parameter as a mean for droplets produced by each of the respective ones.

4. The modular system of claim 2, wherein the instructions when executed are to cause the at least one processor to calculate the parameter as a statistical spread measure for droplets produced by each one of the respective ones.

5. The modular system of claim 2, wherein the instructions when executed are to cause the at least one processor to calculate the parameter as an expected volume for droplets produced by each one of the respective ones.

6. The modular system of claim 5, wherein the instructions when executed are to cause the at least one processor to calculate to a resolution that is finer than one picoliter.

7. The modular system of claim 2, wherein the instructions when executed are to cause the at least one processor to calculate the parameter as an expected droplet trajectory for droplets produced by each one of the respective ones.

8. The modular system of claim 1, wherein the film comprises a transparent tape, and wherein further, the film is embodied in the form of a supply reel of the transparent tape and a take-up reel for portions of the transparent tape, each of the supply reel and the take-up reel mounted by the chassis, and wherein the mechanism comprises a drive system mounted by said chassis to advance the take-up reel following image capture in response to a motor stimulus.

9. The modular system of claim 8, wherein the chassis further mounts a transparent platen at the window, and wherein said modular system further comprises a suction mechanism to adhere the second side of the transparent tape to the transparent platen while droplets are printed on the first side of the transparent tape.

10. The modular system of claim 1, wherein the ink comprises a monomer and wherein the mechanism further comprises a curing mechanism to cure the droplets into a hardened substance following deposition on the first side.

11. The modular system of claim 1, further comprising a control subsystem, the chassis to mount the control subsystem, the control subsystem configured to electronically control actuation of the mechanism and image capture by the image capture subsystem, each according to electronic, external command.

12. The modular system of claim 1, embodied in the printing system, the printing system to receive a series of substrates and print the ink on each substrate in the series using the printhead, the printing system further having a maintenance station, the printing system configured to intermittently transport the printhead to a parked position in the maintenance station, said printing system comprising a motion mechanism to move said modular system relative to the printhead and relative to a chassis of the printing system so as to reposition said film relative to the parked position when the printhead is in the parked position in the maintenance station.

13. The system of claim 12, wherein said motion mechanism is to move said modular system in three dimensions relative to the printhead in the parked position.

14. The system of claim 1, wherein the image capture subsystem comprises a high-resolution, high-speed digital camera mounted by the chassis and an electronically-actuated focus mechanism to adjust focus of images captured by the high-resolution, high-speed digital camera.

15. The modular system of claim 1, wherein:
the substrate defines a plane;
the chassis mounts a supply reel and a take-up reel for the film, each located outside of the plane, on a side of the plane opposite the print head;
the chassis further mounts at least two rollers, each of the rollers to support the film along a path extending from the supply reel to the take up reel, so as to convey the film from the take up supply reel to the plane along a dimension normal to the plane, along the plane past the window in a dimension parallel to the plane, and from the plane to the take up reel in the dimension normal to the plane.

16. A method of measuring a parameter associated with droplet ejection by nozzles of a printhead, the method comprising:
providing a film having a first side and a second side, and positioning the first side proximate to the printhead so as to provide a substrate to receive ink droplets from the nozzles;
capturing an image through the second side of the film using an image capture means, the image representing the ink droplets received from the nozzles at positions respective to the nozzles, and responsively generating an output signal to convey the captured image to an image processing system; and
advancing the film so as to position a fresh portion of the film for an ensuing image capture process in which droplets are received on the first side of the film from nozzles of the printhead, in a manner not requiring repositioning of either the printhead or the image capture means.

17. The method of claim 16, further comprising receiving the captured image with an image processing system, storing the captured image in processor-accessible memory, processing the captured image to associate respective identify image data representing one or more deposited droplets with respective ones of the nozzles, processing each identified set of image data to calculate the parameter for each of the nozzles, and storing the parameter for each of the respective nozzles in processor-accessible memory.

18. The method of claim 17, wherein the parameter comprises a mean for droplets produced by the respective nozzle.

19. The method of claim 17, wherein the parameter comprises a statistical spread measure for droplets produced by the respective nozzle.

20. The method of claim 17, wherein the parameter comprises an expected volume for droplets produced by the respective nozzle.

21. The method of claim 20, wherein the processing further comprises calculating the expected volume to a resolution that is finer than one picoliter.

22. The method of claim 17, wherein the parameter comprises an expected droplet trajectory for droplets produced by the respective nozzle.

23. The method of claim 16, wherein the film comprises a colorless, transparent tape, and wherein further, the film is embodied in the form of a supply reel of the colorless, transparent tape and a take-up real for portions of the colorless, transparent tape, once droplets have been deposited thereon, and wherein the method further comprises using a motor to advance the take-up reel following image capture.

24. An apparatus, comprising:
a printer to receive a first substrate, the printer having a printhead with nozzles, the nozzles to eject an ink onto the first substrate, the ink comprising a liquid that is to be hardened on the first substrate to form a permanent layer of an electronic device thereon, the permanent layer of the electronic device having a thickness; and
a system for use in measuring a parameter associated with droplet ejection by the nozzles of the printhead, the system comprising
a film having a first side and a second side, the first side to be positioned proximate to the printhead so as to provide a second substrate to receive ink droplets from the nozzles;
an image capture subsystem positioned so as to capture an image through the second side of the film, the image representing the ink droplets received from the nozzles at positions respective to the nozzles, the image capture subsystem to generate an output signal to convey the captured image to an image processing system, and
a mechanism to advance the film so as to position a fresh portion of the film for ensuing image capture process in which droplets are received on the first side of the film from nozzles of the printhead, the advancement of the film not requiring required repositioning of either the printhead or the image capture subsystem.

25. The apparatus of claim 24, further comprising a gas enclosure, the gas enclosure to enclose the printer and the system within a controlled atmosphere.

26. The apparatus of claim 24, wherein the printer is to successively print the ink on each one of a series of the first substrates, and wherein the apparatus further comprises a motion system to advance the printhead to a measurement location in between printing on successive substrates in the series and an image processing system, the image processing system having at least one processor and instructions stored on processor-readable media, the instructions when executed to cause the at least one processor to receive the captured image from the image capture subsystem, to store the captured image in processor-accessible memory, to process the captured image to associate respective identify image data representing one or more deposited droplets with respective ones of the nozzles, to process each identified set of image data to calculate the parameter for each of the nozzles, and to store the parameter for each of the respective nozzles in processor-accessible memory.

* * * * *